(12) United States Patent  
Heinrich et al.

(10) Patent No.: US 7,616,200 B1  
(45) Date of Patent: Nov. 10, 2009

(54) SYSTEM FOR REDUCING ALIASING ON A DISPLAY DEVICE

(75) Inventors: Steven J. Heinrich, Huntsville, AL (US); Mark A. Mosley, Arab, AL (US); Clifford A. Whitmore, Huntsville, AL (US); James L. Deming, Madison, AL (US); Stewart G. Carlton, Harvest, AL (US); Matt E. Buckelew, Madison, AL (US); Dale L. Kirkland, Madison, AL (US); Timothy S. Johnson, Huntsville, AL (US)

(73) Assignee: 3Dlabs Inc. Ltd., Hamilton (BM)

( * ) Notice: Subject to any disclaimer, the term of this patent is extended or adjusted under 35 U.S.C. 154(b) by 0 days.

(21) Appl. No.: 09/329,557

(22) Filed: Jun. 10, 1999  
(Under 37 CFR 1.47)

Related U.S. Application Data

(60) Provisional application No. 60/089,030, filed on Jun. 12, 1998.

(51) Int. Cl.  
*G06T 15/00* (2006.01)

(52) U.S. Cl. ............... 345/422; 345/419; 345/530; 345/543

(58) Field of Classification Search ......... 345/419–422, 345/619–620, 629–630, 530, 543, 556  
See application file for complete search history.

(56) References Cited

U.S. PATENT DOCUMENTS

| | | | |
|---|---|---|---|
| 4,434,437 A | 2/1984 | Strolle et al. ............... | 358/140 |
| 4,615,013 A | 9/1986 | Yan et al. ..................... | 364/521 |
| 4,646,232 A | 2/1987 | Chang et al. ................. | 364/200 |
| 4,897,806 A * | 1/1990 | Cook et al. .................. | 345/426 |
| 4,908,780 A | 3/1990 | Priem et al. ................. | 364/521 |
| 4,918,626 A | 4/1990 | Watkins et al. .............. | 364/522 |
| 4,991,122 A | 2/1991 | Sanders ....................... | 364/521 |
| 5,107,415 A | 4/1992 | Sato et al. .................... | 395/800 |
| 5,123,085 A | 6/1992 | Wells et al. .................. | 395/121 |
| 5,239,654 A | 8/1993 | Ing-Simmons et al. ...... | 395/800 |
| 5,287,438 A | 2/1994 | Kelleher ...................... | 395/132 |

(Continued)

FOREIGN PATENT DOCUMENTS

EP 0 311 798 A2 4/1989

(Continued)

OTHER PUBLICATIONS

"A Fine Grained Data Flow Machine and Its Concurrent Execution Mechanism," Iwashita et al., C&C Information Technology Research Labs, Apr. 1989, pp. 63-72.

(Continued)

*Primary Examiner*—Phu K Nguyen  
(74) *Attorney, Agent, or Firm*—Groover & Associates

(57) ABSTRACT

An apparatus and method of displaying a first image on a display device with a plurality of pixels assigns one of a plurality of sample patterns to each pixel on the display device. Each pixel is assigned the one of a plurality of patterns based upon its unique location on the display device. Each sample pattern has at least one sample location. It then is determined if the first image intersects any of the sample locations on each pixel. Pixels determined to have at least one sample location that intersect the first image thus are illuminated.

61 Claims, 15 Drawing Sheets

U.S. PATENT DOCUMENTS

| | | | |
|---|---|---|---|
| 5,293,480 A | 3/1994 | Miller et al. | 395/163 |
| 5,313,551 A | 5/1994 | Labrousse et al. | 395/425 |
| 5,363,475 A | 11/1994 | Baker et al. | 395/122 |
| 5,371,840 A | 12/1994 | Fischer et al. | 395/133 |
| 5,394,524 A | 2/1995 | DiNicola et al. | 395/163 |
| 5,398,328 A | 3/1995 | Weber et al. | 395/500 |
| 5,446,479 A | 8/1995 | Thompson et al. | 345/139 |
| 5,485,559 A | 1/1996 | Sakaibara et al. | 395/133 |
| 5,511,165 A | 4/1996 | Brady et al. | 395/200.01 |
| 5,519,823 A | 5/1996 | Barkans | 395/143 |
| 5,544,294 A | 8/1996 | Cho et al. | 395/141 |
| 5,555,359 A | 9/1996 | Choi et al. | 395/141 |
| 5,557,734 A | 9/1996 | Wilson | 395/162 |
| 5,561,749 A | 10/1996 | Schroeder | 395/120 |
| 5,572,713 A | 11/1996 | Weber et al. | 395/500 |
| 5,631,693 A | 5/1997 | Wunderlich et al. | 348/7 |
| 5,664,114 A | 9/1997 | Krech, Jr. et al. | 395/200.64 |
| 5,666,520 A | 9/1997 | Fujita et al. | 345/513 |
| 5,684,939 A | 11/1997 | Foran et al. | 395/131 |
| 5,701,365 A | 12/1997 | Harrington et al. | 382/212 |
| 5,706,481 A | 1/1998 | Hannah et al. | 395/519 |
| 5,721,812 A | 2/1998 | Mochizuki | 395/110 |
| 5,737,455 A | 4/1998 | Harrington et al. | 382/284 |
| 5,757,375 A | 5/1998 | Kawase | 345/429 |
| 5,757,385 A | 5/1998 | Narayanaswami et al. | 345/505 |
| 5,764,237 A | 6/1998 | Kaneko | 345/430 |
| 5,821,950 A | 10/1998 | Rentschler et al. | 345/505 |
| 5,841,444 A | 11/1998 | Mun et al. | 345/506 |
| 5,870,567 A | 2/1999 | Hausauer et al. | 395/281 |
| 5,883,641 A | 3/1999 | Krech, Jr. et al. | 345/505 |
| 5,914,711 A | 6/1999 | Mangerson et al. | 345/203 |
| 6,300,956 B1 * | 10/2001 | Apodaca et al. | 345/619 |

FOREIGN PATENT DOCUMENTS

| | | |
|---|---|---|
| EP | 0 397 180 A2 | 11/1990 |
| EP | 0 438 194 A2 | 7/1991 |
| EP | 0 448 286 A2 | 9/1991 |
| EP | 0 463 700 A2 | 1/1992 |
| EP | 0 566 229 A2 | 10/1993 |
| EP | 0 627 682 A1 | 12/1994 |
| EP | 0 631 252 A2 | 12/1994 |
| EP | 0 693 737 A2 | 1/1996 |
| EP | 0 734 008 A1 | 9/1996 |
| EP | 0 735 463 A2 | 10/1996 |
| EP | 0 810 553 A2 | 12/1997 |
| EP | 0 817 009 A2 | 1/1998 |
| EP | 0 825 550 A2 | 2/1998 |
| EP | 0 840 279 A2 | 5/1998 |
| EP | 0 910 047 A2 | 4/1999 |
| WO | WO 86/07646 | 12/1986 |
| WO | WO 92/00570 | 1/1992 |
| WO | WO 93/06553 | 4/1993 |
| WO | WO 97/21192 | 6/1997 |
| WO | WO 97/41536 | 11/1997 |

OTHER PUBLICATIONS

"A Dataflow Image Processing System TIP-4," Fujita et al., C&C Information Technology Research Labs, NEC Corporation, Sep. 1989, pp. 735-741.

"Processing the New World of Interactive Media," Rathnam, The Trimedia VLIW CPU Architecture, Mar. 1998, pp. 108-117.

"Effective Cache Mechanism for Texture Mapping," IBM Technical Disclosure Bulletin, vol. 39, No. 12, Dec. 1996, pp. 213-217.

"Advanced Raster Graphics Architecture," pp. 890-893, 1990.

"Data-Format Conversion: Intel/Non-Intel," vol. 33, No. 1A, Jun. 1990, IBM Technical Disclosure Bulletin, pp. 420-427.

"Address Munging Support in a Memory Controller/PCI Host Bridge for the PowerPC 603 CPU Operating in 32-Bit Data Mode," IBM Technical Disclosure Bulletin, vol. 38, No. 09, Sep. 1995, pp. 237-240.

"One Frame Ahead: Frame Buffer Management for Animation and Real-Time Graphics," Auel et al., Tektronix Inc., pp. 43-50, 1988.

"Efficient Alias-Free Rendering Using Bit-Masks and Look-Up Tables," Abram et al., The University of North Carolina at Chapel Hill, XP-002115680, Jul. 1985, pp. 53-59.

"A New Simple and Efficient Antialiasing with Subpixel Masks," Schilling et al., Computer Graphics, vol. 25, No. 4, Jul. 1991, pp. 133-141.

"A Multiprocessor System Utilizing Enhanced DSP's for Image Progressing," Ueda et al., pp. 611-619, 1988.

"The Reyes Image Rendering Architecture," Cook et al., Computer Graphics, vol. 21, No. 4, Jul. 1987, pp. 95-102.

"The Accumulation Buffer: Hardware Support for High-Quality Rendering," Haeberli et al., Computer Graphics, vol. 24, No. 4, Aug. 1990, pp. 309-318.

"Advanced Animation and Rendering Techniques," Watt et al., ACM Press, New York, New York, pp. 127-137, 1988.

The A-Buffer, an Antialiased Hidden Surface Method, Carpenter, Loren, Computer Graphics, vol. 18, No. 3, Jul. 1984, pp. 13-18.

"The A-buffer, an Antialiased Hidden Surface Method," Loren Carpenter, Computer Graphics, vol. 18, No. 3, pp. 13-18, Jul. 1984.

"Advanced Animation and Rendering Techniques," Theory and Practice, Alan Watt and Mark Watt, pp. 127-137.

"Efficient Alias-free Rendering using Bit-masks and Look-up Tables," Greg Abram and Lee Westover,The University of North Carolina at Chapel Hill,, vol. 19, No. 3, 1985.

"A New Simple and Efficient Antialiasing with Subpixel Masks," Schilling et al., Computer Graphics, vol. 25, No. 4, Jul. 1991, pp. 133-140.

"The Accumulation Buffer: Hardware Support for High-Quality Rendering," Paul Haeberli et al., Computer Graphics, vol. 24, No. 4, Aug. 1990, pp. 309-318.

"The Reyes Image Rendering Architecture," Cook et al., Computer Graphics, vol. 21, No. 4, Jul. 1987, pp. 95-102.

"Transparency and Antialiasing Algorithms Implement with the Virtual Pixel Maps Technique," Mammen et al., IEEE Computer Graphics and Applications, vol. 9, No. 4, Jul. 1, 1989, pp. 43-55.

* cited by examiner

SYSTEM FOR REDUCING ALIASING ON A DISPLAY DEVICE

PRIORITY

This application claims priority from U.S. provisional patent application Ser. No. 60/089,030, filed Jun. 12, 1998, entitled "SYSTEM FOR REDUCING ALIASING ON A DISPLAY DEVICE", the disclosure of which is incorporated herein, in its entirety, by reference.

FIELD OF THE INVENTION

The invention generally relates to computer graphics processing and, more particularly, the invention relates to graphics accelerators having parallel processors.

BACKGROUND OF THE INVENTION

Antialiasing techniques were developed to reduce the effects of displaying continuous images on a display device having discrete pixels. Some antialiasing techniques divide a pixel into many subpixels and store pixel attribute information for each subpixel (e.g., U.S. Pat. No. 5,484,939 to Foran et al.). Such attribute information typically includes color and depth data. Storing such information, however, significantly multiplies hardware storage requirements, thus increasing the cost of implementing such techniques.

SUMMARY OF THE INVENTION

In accordance with one aspect of the invention, an apparatus and method of displaying a first image on a display device with a plurality of pixels assigns one of a plurality of sample patterns to each pixel on the display device. Each pixel is assigned the one of a plurality of patterns based upon its unique location on the display device. Each sample pattern has at least one sample location. It then is determined if the first image intersects any of the sample locations on each pixel. Pixels determined to have at least one sample location that intersect the first image thus are illuminated.

In preferred embodiments, the first image is defined by first image attribute data and first image depth data. The first image depth data defines the depth plane of the first image. A given pixel thus is illuminated by determining, on the given pixel, if a second image intersects at least one sample location that is intersected by the first image. The second image also includes second image depth data defining the depth plane of the second image. At least the first image attribute data is utilized to illuminate the given pixel if the first image depth data indicates that the first image is at a higher depth plane than the depth plane of the second image for at least one of the intersected sample locations.

In a manner similar to the first image, the second image includes second image attribute data. At least the second image attribute data also is utilized to illuminate the given pixel if the second image depth data indicates that the second image is at a higher depth plane than the depth plane of the first image for at least one of the intersected sample locations. A weighted average of the first image attribute data and second image attribute data may be utilized to illuminate the given pixel when each has a higher depth plane for at least one of the sample locations of the given pixel. Attribute data may include color data.

The sample patterns may include a first and second sample pattern that have sample locations in different locations of different pixels. Each sample pattern preferably is stored in a look-up table. The look-up table may be accessed to locate the sample pattern for a selected pixel based upon the unique location of such pixel on the display device. In preferred embodiments, a random number is assigned to each pixel based upon its unique location on the display device. The random number thus may be utilized for a given pixel as an index to the look-up table to retrieve the sample pattern for such given pixel.

In accordance with another aspect of the invention, a method of illuminating a pixel on a display device detects one or more images that intersect the pixel. A data slot is generated for each image that intersects the pixel. Each data slot includes attribute data and depth data for its image on the pixel. A weighted pixel attribute average for the attribute data of all slots is calculated each time a new slot is generated. The weighted average is used to illuminate the pixel each time the weighted average is calculated.

In accord with yet another aspect of the invention, an apparatus and method of storing pixel data for illuminating a pixel on a display device samples the pixel to produce a first number of samples. A given portion of pixel memory also is allocated for storing pixel data. In preferred embodiments, the pixel data is stored in data slots in the pixel memory. The pixel data in each data slot represents the intersection of one image with the samples, where the storage of pixel data in each data slot is based upon the total number of samples. It is determined if the given portion of pixel memory is filled. The first number of samples consequently is reduced if it is determined that the given portion of pixel memory is filled. At least a portion of the given portion of pixel memory becomes available as a result of the first number of pixels being reduced.

In some embodiments, the given portion of pixel memory is non-contiguous. The given portion of pixel memory may be preconfigured to include a given number of data slots with no pixel data. The given portion of pixel memory may be determined to be filled when pixel data is stored in all of the given number of data slots. It thus may be determined that a given image intersects with at least one of the samples. A data slot with no data in the given portion of pixel memory may be located if the given image is determined to intersect at least one of the samples. Pixel data relating to the given image in the located data slot then is stored.

One or more data slots in the pixel memory may be made available for storing pixel data as a result of the first number of samples being reduced. No pixel data for a given image is stored in a data slot when no samples intersect the given image. In preferred embodiments, each data slot includes a coverage mask identifying a set of samples that intersects the image. The coverage mask may include a single bit representing each of the samples. The pixel data representing the intersection of one image with the samples may include data identifying the total number of samples that are intersected. The total number of samples that are intersected may range from no samples to the first number of samples.

In accordance with another aspect of the invention, an apparatus and method of storing pixel data for illuminating a given pixel on a display device (having a plurality of pixels) samples the given pixel to produce a first number of samples. At least one of the samples are intersected by a given image. A given portion of pixel memory also is allocated for storing pixel data for any image that intersects any of the plurality of pixels on the display device. If it is determined that the given portion of pixel memory is filled with pixel data, then the first number of samples is reduced, which causes at least a portion of the given portion of pixel memory to become available. Pixel data relating to the given pixel then is stored in the given portion of the pixel memory.

In accordance with another aspect of the invention, a pixel data storage apparatus stores pixel data representing the intersection of a given image with a given pixel (having one or more sample locations) on a display device. To that end, the pixel data storage apparatus includes a coverage mask that stores intersection information relating to the sample locations intersected by the given image, an attribute data field that stores attribute data for the given image, and a pointer that points to one of a terminator value and another pixel data storage apparatus.

In some embodiments, the terminator value is a null value, and/or the attribute data may be either or both depth data relating to the depth of the given image, and attribute data relating to the color of the given image. Each sample location also preferably includes an associated bit in the coverage mask. The apparatus also may include a sample reduction field for storing data indicating that the total number of sample locations is less than a maximum number of samples.

In accordance with still other aspects of the invention, the graphics processor utilizes jittered subsample locations. To that end, the graphics processor includes a system bus interface that receives polygon data from a central processing unit. The polygon data may include vertex data that defines a selected polygon. The graphics processor further includes a subpixel sample location generator for generating a plurality of sets of subpixel sample locations. Each set of subpixel sample locations is associated with one of the pixels and has values that are dependent upon the location of the associated pixel. The graphics processor further includes a rasterizer that receives the polygon data and determines, by accessing the memory, which of the subpixel sample locations on each pixel are covered by the selected polygon. The subpixel sample location generator may define a plurality of subpixel regions on each pixel, wherein each subpixel region in a selected pixel includes one of the subpixel sample locations in one set of subpixel sample locations. The rasterizer also may have a pixel value determiner that determines the color value of each pixel on the display device.

In further aspects of the invention, the pixels having sample locations that are covered by the selected polygon are included in a set of pixels. The rasterizer determines pixel attributes of each pixel in the set of pixels based upon the number of covered sample locations within each pixel. The attributes may include color, transparency, depth, coordinate, and intensity information. In preferred embodiments, the subpixel sample location generator includes a look-up table.

In other embodiments of the invention, the sets of subpixel sample locations are identical for selected pixels on the display device. The sets of subpixel sample locations may be different for selected of pixels on the display device. In one embodiment, the rasterizer rasterizes pixels having different sets of subpixel sample locations. The rasterizer also may process first and second pixels having different sets of subpixel sample locations.

Some embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
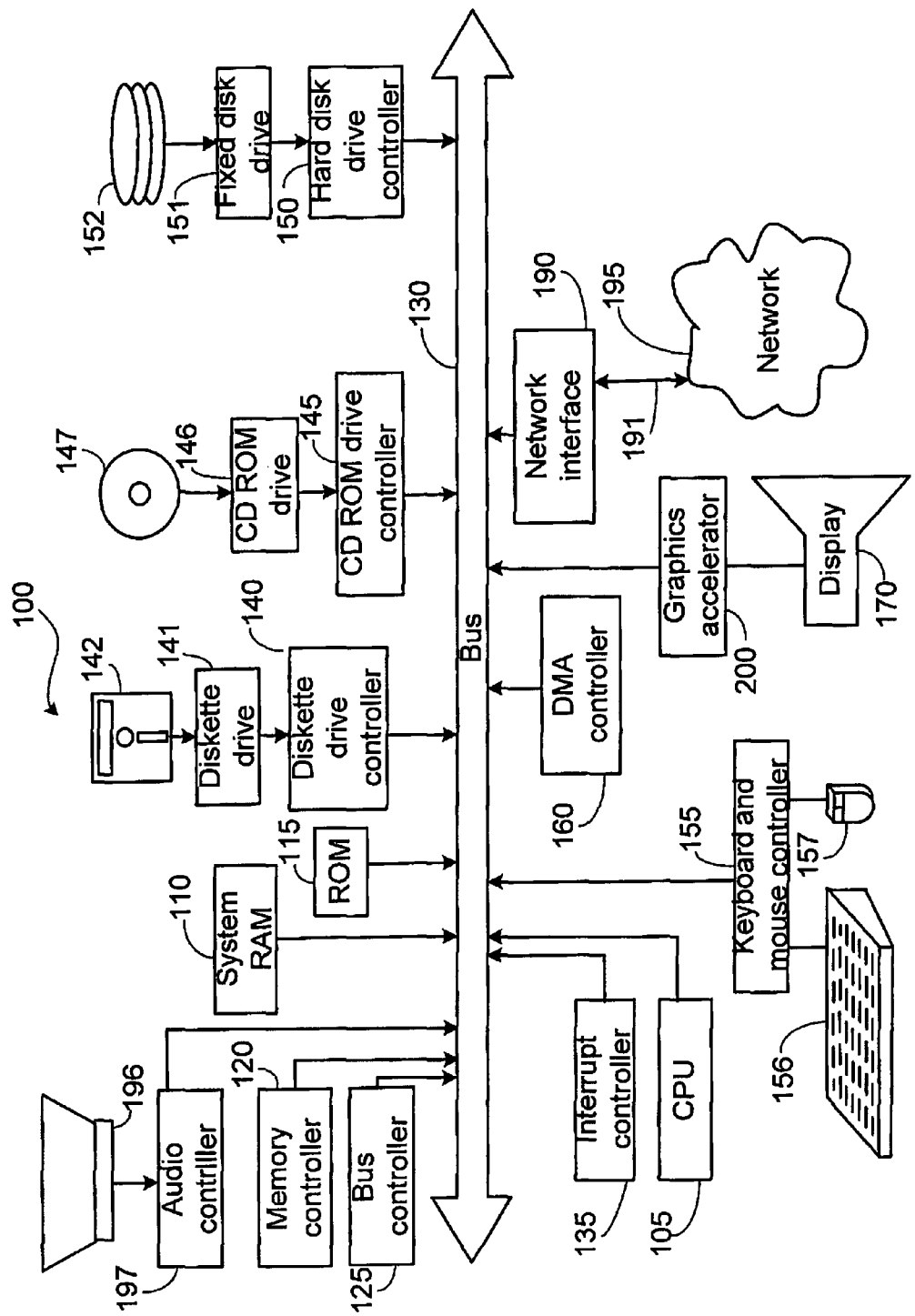
FIG. 1 schematically shows the system architecture of an exemplary computer system on which preferred embodiments of the invention may be implemented.

Preferred embodiments of the invention efficiently produce antialiased output for display on a pixel based display device. FIG. 1 illustrates a system architecture for an exemplary computer system 100, such as an Intergraph EXTREME-Z™ graphics workstation (distributed by Intergraph Corporation of Huntsville, Ala.), on which the disclosed method and apparatus for producing antialiased graphical output may be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 130 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a graphics accelerator 200 (discussed in detail below) that controls the display device 170 in accord with the OPENGL™ standard. The display device 170 preferably is a conventional horizontal scan cathode ray tube ("CRT") monitor having a plurality of pixels. The pixels are arranged in a two-dimensional X-Y grid and are selectively lit, as directed by the graphics accelerator 200, for displaying an image. The display device 170 may be, for example, an IBM G72 General Series Monitor, distributed by International Business Machines Corporation of Armonk, N.Y.

A network adapter 190 also may be included that enables the computer system 100 to connect to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT® operating system (available from Microsoft Corp., of Redmond, Wash.). Among other computer system control functions, the operating system controls allocation of system resources and performs tasks such as process scheduling, memory management, networking, and I/O services.

Figure 2A:
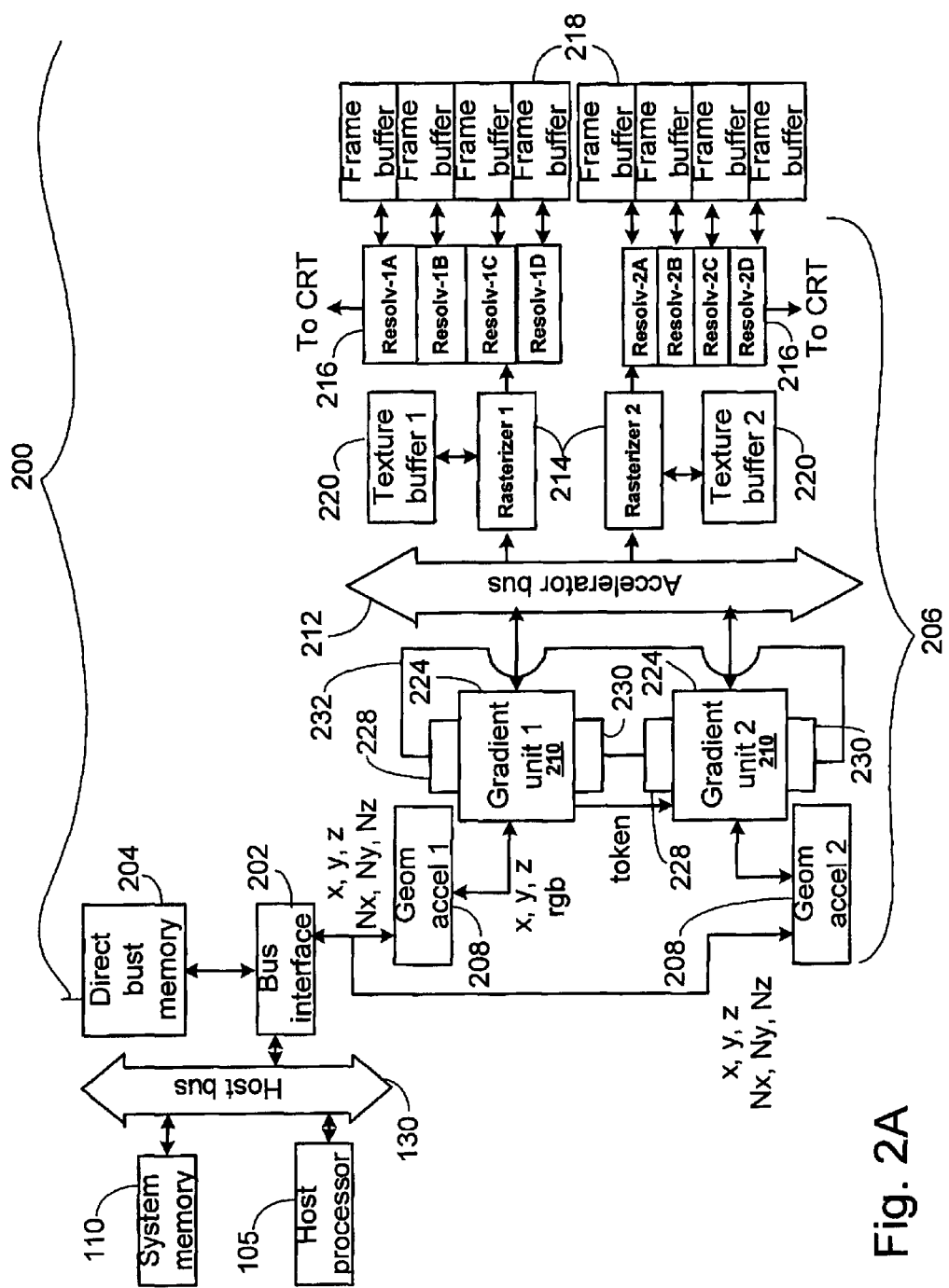
FIG. 2A schematically shows a graphics accelerator having a plurality of parallel graphical data processing units configured in accordance with preferred embodiments of the invention.

FIG. 2A schematically shows the graphics accelerator 200 configured in accordance with preferred embodiments of the invention. The exemplary graphics accelerator 200 in FIG. 2A has two geometry accelerators (described below) and two post geometry accelerator processors (i.e., two rasterizer/gradient unit pairs, discussed below, referred to herein as "attribute processors 314"). Of course, because two of each type of processor are discussed for simplicity, it should be apparent to those skilled in the art that additional or fewer processors may be utilized. As noted above, the graphics accelerator 200 preferably includes a plurality of parallel processing units that divide the graphics processing in an efficient manner among processors.

The graphics accelerator 200 preferably includes a bus interface 202 for interfacing with the system bus 130, direct burst memory 204 for temporarily storing graphics request streams received from the host processor 105, and the plurality of processing units for processing the graphics request stream. In preferred embodiments, the direct burst memory 204 is in the form of "write combining memory", commonly defined and utilized by Intel microprocessors (e.g., PENTIUM II™ central processing units), available from Intel Corporation of Santa Clara, Calif. Such memory 204 preferably is configured to receive graphics request stream data in bursts directly from the CPU. See, for example, copending provisional U.S. patent application, having Ser. No. 60/091,401 entitled "Method and System for Transporting Information to a Graphic Accelerator Card", for more details on the use of direct burst memory 204, the disclosure of which is incorporated herein, in its entirety, by reference.

The plurality of processing units preferably processes three dimensional ("3D") graphical images as a plurality of individual triangles defined in 3D space. As known in the art, this method of processing 3D graphical images is known as "tessellation." The plurality of processing units receives incoming triangle vertex data and, based upon such vertex data, ultimately draws each triangle on the display device 170. The incoming vertex data for a given vertex preferably includes the X, Y, and Z coordinate data for the given vertex (identifying the location of the vertex in 3D space), and three directional vector components ("normal vectors") that are perpendicular to the surface of the triangle at that given vertex.

Accordingly, the plurality of processors preferably includes a plurality of parallel geometry accelerators 208 that each receive the incoming triangle vertex data from the bus interface 202 and, based upon such incoming data, calculate attribute data (e.g., color data, depth data, transparency data, intensity data, coordinates of the vertices on the display device 170, etc. . . . ) for each of the vertices in the triangle. In preferred embodiments, the state of each geometry accelerator 208 is preconfigured with previously received state data from the host. When in a given state, a given geometry accelerator processes the incoming data to produce the vertex attributes in accord with the preconfigured state. For example, mathematical models of various images (e.g., a golf ball) and light sources may be stored within memory of the geometry accelerators 208. Such models may be retrieved and utilized to produce the vertex attribute data upon receipt of state data setting the state of the geometry accelerators 208. The state of a given geometry accelerator 208 may be changed upon receipt of new state data that correspondingly changes the state of the given geometry accelerator 208.

Once calculated by the geometry accelerators 208, the vertex attribute data is transmitted to the attribute processors 314 (discussed above). More particularly, the vertex attribute data is forwarded to a plurality of parallel gradient producing units 210 that each calculate gradient data for one of the triangles. In general terms, gradient data indicates the rate of change of attributes for each pixel in a triangle as a function of the location of each pixel in the triangle. In preferred embodiments, the gradient data is in the form of mathematical derivatives. The gradient data and attribute data then are broadcasted, via an accelerator bus 212, to a plurality of parallel rasterizers 214. Each rasterizer 214 calculates pixel attribute data for select pixels within a triangle based upon the vertex attribute data and the gradient data. A plurality of resolvers 216 then stores the resultant attribute data for each pixel in one of a plurality of double buffered frame buffers 218. A texture buffer 220 also may be included for performing texture operations.

Figure 2B:
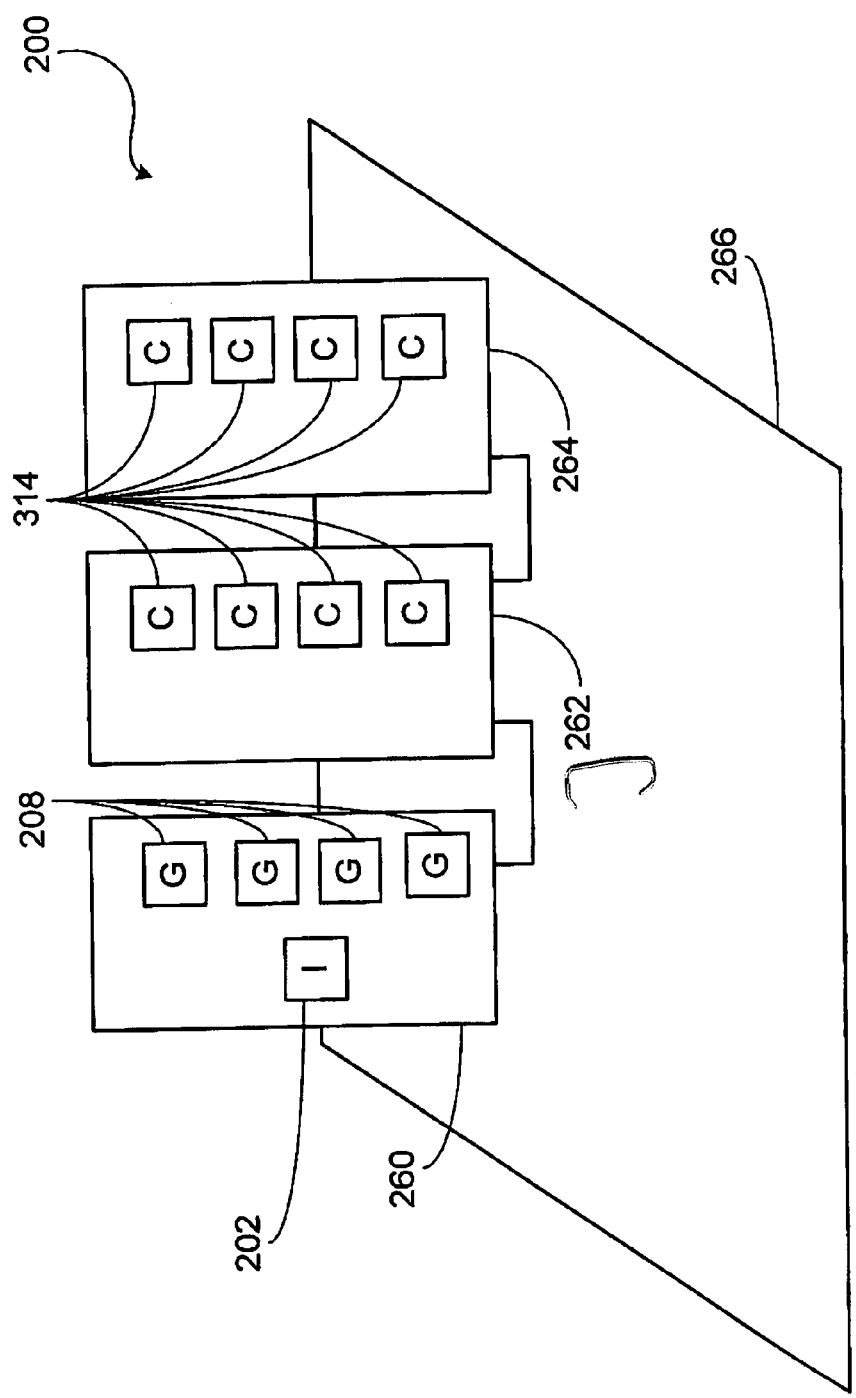
FIG. 2B shows an exemplary graphics accelerator card.

As suggested above, preferred embodiments of the invention include eight each of the geometry accelerators 208, gradient producing units 210, rasterizers 214, and frame buffers 218. Each of these elements preferably is coupled to a circuit board to form a single graphics card (i.e., graphics accelerator 200). FIG. 2B shows an exemplary graphics accelerator card having one interface 202, four geometry accelerators 208, and eight attribute processors 314. In preferred embodiments, the interface 202 and four geometry accelerators 208 are coupled to a first card 260, four attribute processors 314 are coupled to a second card 262, and four additional attribute processors 314 are coupled to a third card 264. Each of the first, second, and third cards 260, 262, and 264 plug into extension slots on a parent motherboard card 266 to form the graphics accelerator 200.

Alternative embodiments utilize different numbers of each of the elements. Among other methods, the various elements communicate via a peer-to-peer token passing configuration, the accelerator bus 212, and a video data bus. In preferred embodiments, each attribute processor 314 produces pixel attribute data for a set of pixels of the display device 170. None of the sets of pixels, however, has a pixel that is within another one of the sets of pixels.

Each frame buffer 218 preferably is a double-buffered sixty-four megabyte frame buffer 218 having a back buffer and a front buffer. Accordingly, the contents of the front buffer is displayed by the display device 170 while the resolver 216 is writing to the back buffer. Conventional buffer swaps enable the contents of the back buffer to be displayed. To effectuate this, each rasterizer 214 (with its associated resolvers 216 and frame buffers 218) includes an associated back end unit 234 for removing frame buffer information and displaying it on the display device 170. In preferred embodiments, each attribute processor 314 includes its own dedicated back end unit 234.

Additional details of the operation of the graphics accelerator 200 discussed above are disclosed in copending provisional U.S. patent application Ser. No. 60/093,247 entitled, "MULTI-PROCESSOR GRAPHICS ACCELERATOR", filed on Jul. 17, 1998, assigned to Intergraph Corporation, the disclosure of which is incorporated herein, in its entirety, by reference.

In accordance with preferred embodiments of the invention, each attribute processor 314 is preconfigured to produce antialiased graphical output for display by the display device 170. To that end, each pixel on the display device 170 is sampled (in memory) in sixteen different locations. As discussed in greater detail below, based upon its location on the display device 170, each pixel is assigned a unique pattern of sample locations 302 (a/k/a "samples") that are utilized to determine the intersection of each pixel and one or more images (e.g., a triangle). In preferred embodiments, an image is considered to intersect a given pixel based upon the total number of sample locations that such image intersects. For example, a given triangle that intersects four of sixteen sample locations on a given pixel is considered to cover twenty-five percent of such pixel. The attribute processor 314 thus illuminates a given pixel based upon a weighted average of the coverage of all the images intersecting the given pixel. Details of these and related processes are discussed below.

Figure 3:
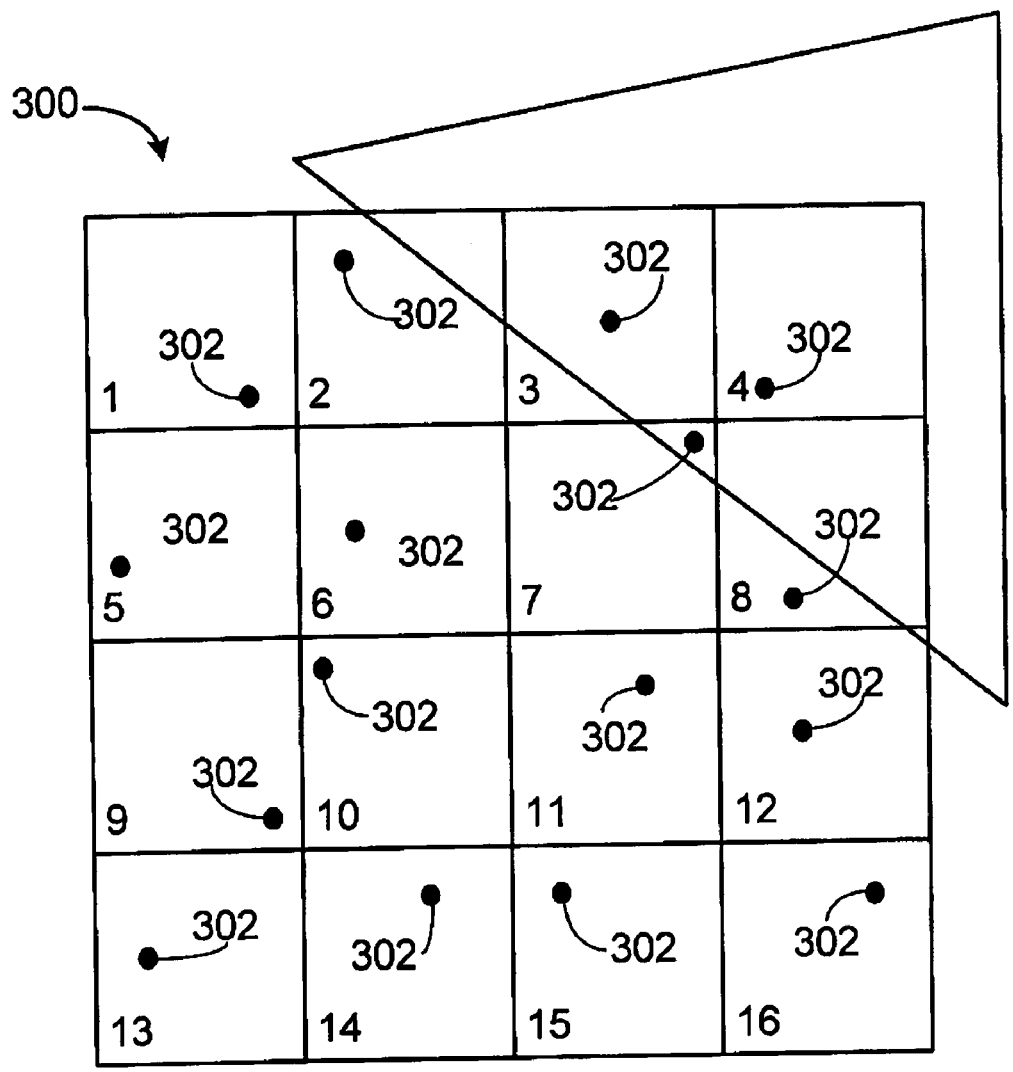
FIG. 3 shows an exemplary pixel that is intersected by one given triangle.

FIG. 3 shows an exemplary pixel 300 that is intersected by one given triangle. In accord with preferred embodiments, the pixel 300 includes sixteen sample locations 302 that are identified in blocks one to sixteen. Each sample location 302 thus is utilized to determine the attributes of the single pixel 300 by determining the total number of sample locations 302 within the area of the given triangle. In the example shown, the given triangle includes three sample locations 302. Due to the random nature of the sample locations 302, merely occupying most of the area of a given block in the pixel 300 does not necessarily suggest that the sample location 302 within such block is within the given triangle. Specifically, the given triangle encompasses a small portion of block seven and yet, includes the sample location 302 in that block. Conversely, the given triangle encompasses most of block eight and still does not include the sample location 302 in that block.

Each pixel is assigned a sample pattern based upon its unique location on the display device 170. For example, on a conventional display device 170 arranged in rows and columns, each pixel is assigned a sample pattern based upon its row and column number (a/k/a its "X" and "Y" values). Each sample pattern preferably locates a preselected number of sample locations 302 in preselected locations on a given pixel. In preferred embodiments, a maximum of sixteen sample locations 302 are utilized. In other embodiments, instead of using sixteen sample locations 302, the sample pattern can have eight, four, or two sample locations 302. No two contiguous pixels preferably have the same sample pattern. In some embodiments, each pixel on the display device 170 can have a different sample pattern. It should be noted that although two, four, eight, and sixteen sample locations are disclosed, any number of sample locations may be utilized.

Figure 4:
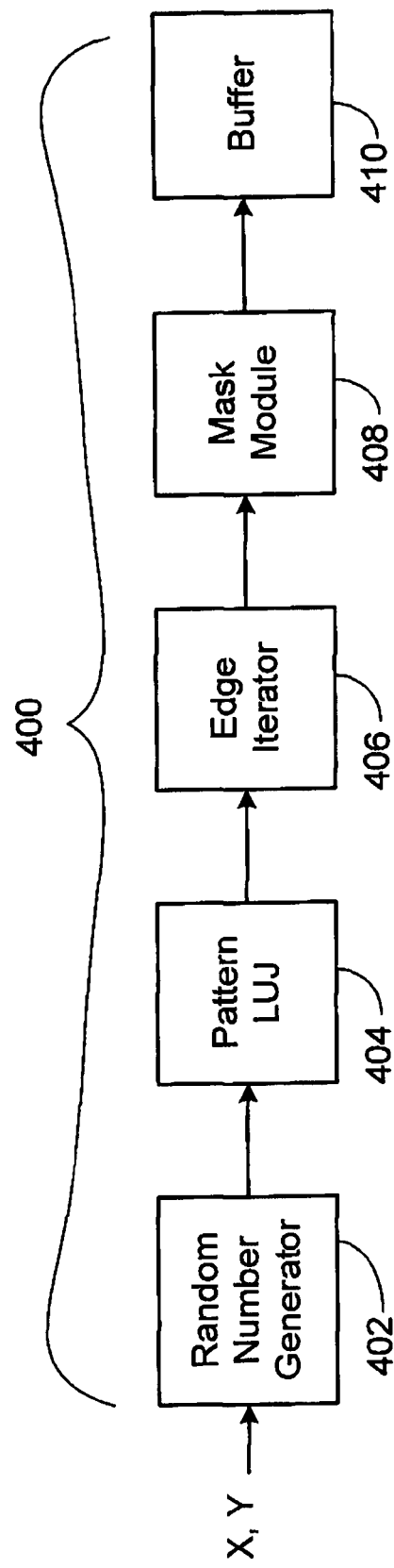
FIG. 4 schematically shows a preferred antialiasing pipeline that may be utilized to produce antialiased graphical output for each pixel in the display device.

FIG. 4 schematically shows a preferred antialiasing pipeline 400 that may be utilized to produce antialiased graphical output for each pixel on the display device 170. Each of the elements of the pipeline 400 preferably is a part of an application specific integrated circuit ("ASIC") that is preconfigured to perform a specified function. More particularly, the pipeline 400 preferably includes a random number generator 402 that receives the "X" and "Y" coordinates of a given pixel as input, and generates a random number based upon the received coordinates. Preferred embodiments generate the random number based upon well known stochastic processes. For example, preferred embodiments utilize the well known Perlin Noise function, or the well known Poisson Disc Distribution to effectuate stochastic sampling.

The pipeline 400 further includes a pattern look-up table memory 404 for storing a plurality of random sample patterns. The table memory 404 may be any type of memory, including conventional random access memory, such as SRAM (static random access memory) or DRAM (dynamic random access memory). The table memory 404 receives the random number as an index to an internal look-up table having each of the plurality of sample patterns. Upon retrieving a sample pattern from the internal look-up table, the table memory 404 forwards such sample pattern to an edge iterator 406.

The edge iterator 406 determines if the area of each triangle intersecting the given pixel intersects any of the sample locations 302 in the sample pattern received from the table memory 404. To that end, conventional rasterization processes may be utilized to determine which triangle edge(s) intersect the given pixel. In preferred embodiments, for those edges that do not intersect the origin of the given pixel, only twelve of the sixteen sample locations 302 are analyzed. Once all three edges of a triangle are analyzed, their results are combined (e.g., via a logical "AND" operation) to determine which sample locations 302 intersect the given triangle.

In preferred embodiments, a coverage mask 506 (see FIG. 5) is utilized to store data identifying the sample locations 302 that are intersected by an image. A preferred coverage mask 506 comprises sixteen bits that each represent one sample location of a pixel. Accordingly, the coverage mask 506 for the triangle in FIG. 3 has bits set (to "1") for blocks three, four, and seven. Conversely, the remaining bits in such coverage mask 506 are not set. The location of each bit in the coverage mask 506 preferably corresponds to the number of the block. The coverage mask 506 for the triangle of FIG. 3 thus is as follows:

0000000001001100

Coverage Mask 506 for Triangle of FIG. 3

The pipeline 400 thus includes a mask module 408 that generates the coverage mask 506 for each image intersecting the given pixel. The mask module 408 also preferably stores the coverage mask 506 within a data slot (discussed below) that includes additional data relating to the triangle. For example, such data may include depth, color, and transparency data. The mask module 408 then forwards the slot data to a pixel buffer 410 that is utilized by other modules of the attribute processor 314 to illuminate the given pixel.

Figure 5:
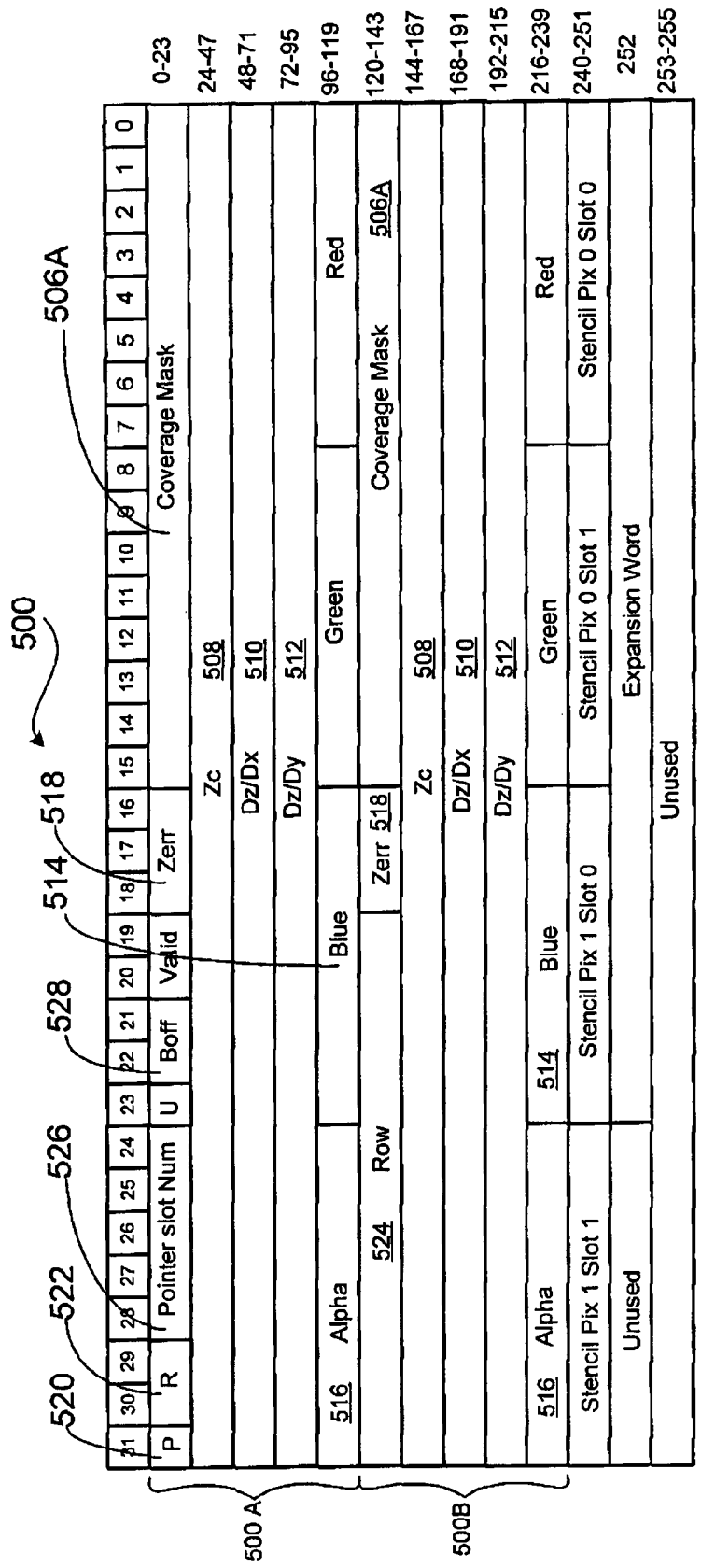
FIG. 5 schematically shows a preferred embodiment of a data slot pair that may be utilized to store data relating to a triangle intersecting a given pixel.

In preferred embodiments, data slots are allocated (i.e., generated) in pairs. In other embodiments, slots are not allocated in pairs. FIG. 5 schematically shows a preferred embodiment of a data slot pair 500 that may be utilized to store data relating to a triangle intersecting a given pixel. Specifically, the slot pair 500 includes a first slot 500A for storing data relating to a first triangle intersecting the given pixel, and a second slot 500B for storing data relating to a second triangle intersecting the given pixel. The slot pair 500 includes fields for storing attribute data for each of the first and second triangles, and slot management fields for managing slot pairs 500 in memory. Each field is allocated a predetermined number of bits that are utilized to specify the data.

The attribute data fields are identical in each slot of the slot pair 500. More particularly, each slot includes:
 a sixteen bit coverage mask field 506A (described above) to identify covered sample locations 302;
 a thirty-two bit Zc field 508 ("Z-center" field) to identify the depth value at the center of the pixel for the triangle of interest (i.e., the triangle having data in such slot);
 a thirty-two bit field 510 for the gradient (i.e., rate of change) of Z (depth) in the X-direction for the triangle of interest;
 a thirty-two bit field 512 for the gradient of Z in the Y-direction for the triangle of interest;
 a twenty-four bit color field 514 for the color of the triangle of interest (eight bits for each of blue, green, and red);
 an eight bit alpha field 516 for transparency (i.e., referred to as an "alpha" value) of the triangle of interest; and
 a three bit Z-error field 518 (one bit for each of the X, Y, and Z directions) showing the distance from the center point of the pixel to the triangle of interest. This field is included for situations in which the actual value of gradient or Z-center data is too large to store in a thirty-two bit data location.

As noted above, the two slots in the slot pair 500 also share various slot management fields. Many of these fields are discussed in greater detail with reference to FIGS. 6A-6C, each of which show the storage of slot pairs 500 in pixel memory (a/k/a pixel buffer 410). Among the slot management fields, the slot pair 500 includes a one bit pointer valid field 520 that indicates if the slot pair 500 is pointing to another slot field, a two bit row field 522 that, when combined with a thirteen bit row field 524, identifies the row address in memory of another slot pair 500 to which the slot pair 500 is pointing. The slot management fields also include a five bit pointer index field 126 that identifies the specific offset location within the page in memory to which the slot pair 500 is pointing, and a two bit back-off field 528 that identifies whether a memory conservation state has been implemented. Details of the back-off field 528 and its related processes are discussed below with reference to FIGS. 11 and 12.

Figure 6A:
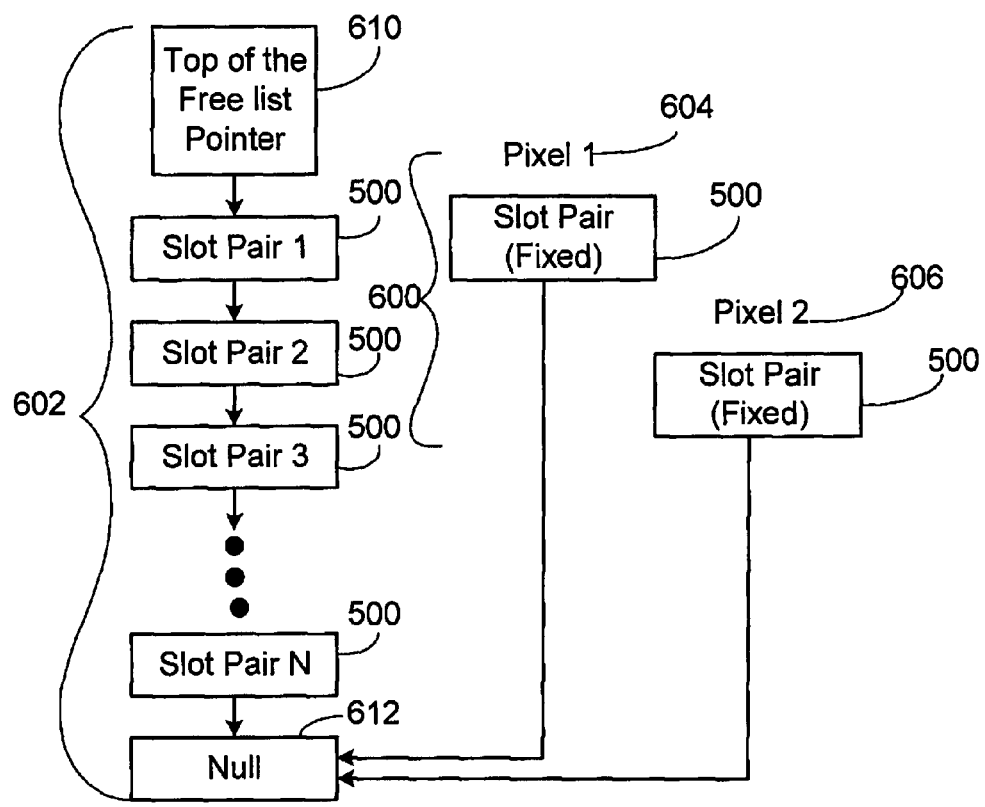
FIG. 6A shows first pixel and second pixels that having no slot pairs from a free memory list.
Figure 6B:
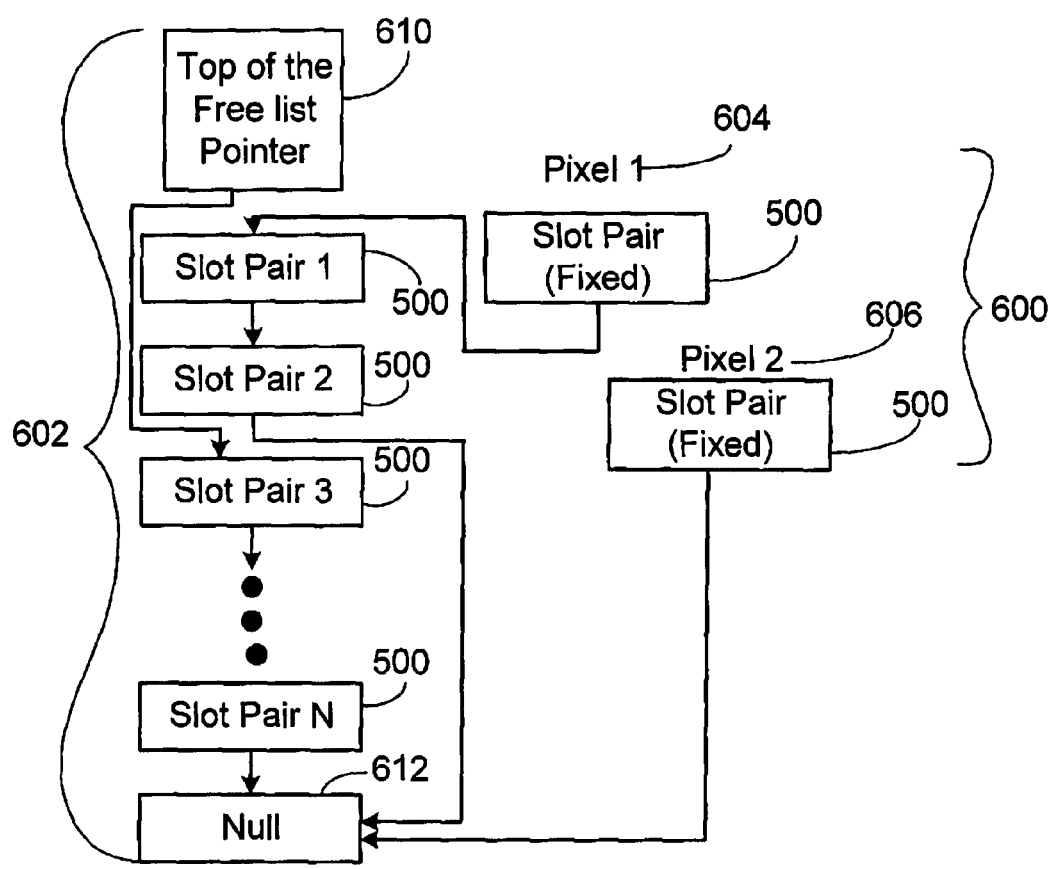
FIG. 6B shows an instance in which the first pixel in FIG. 6A includes first and second slot pairs in the free memory list.
Figure 6C:
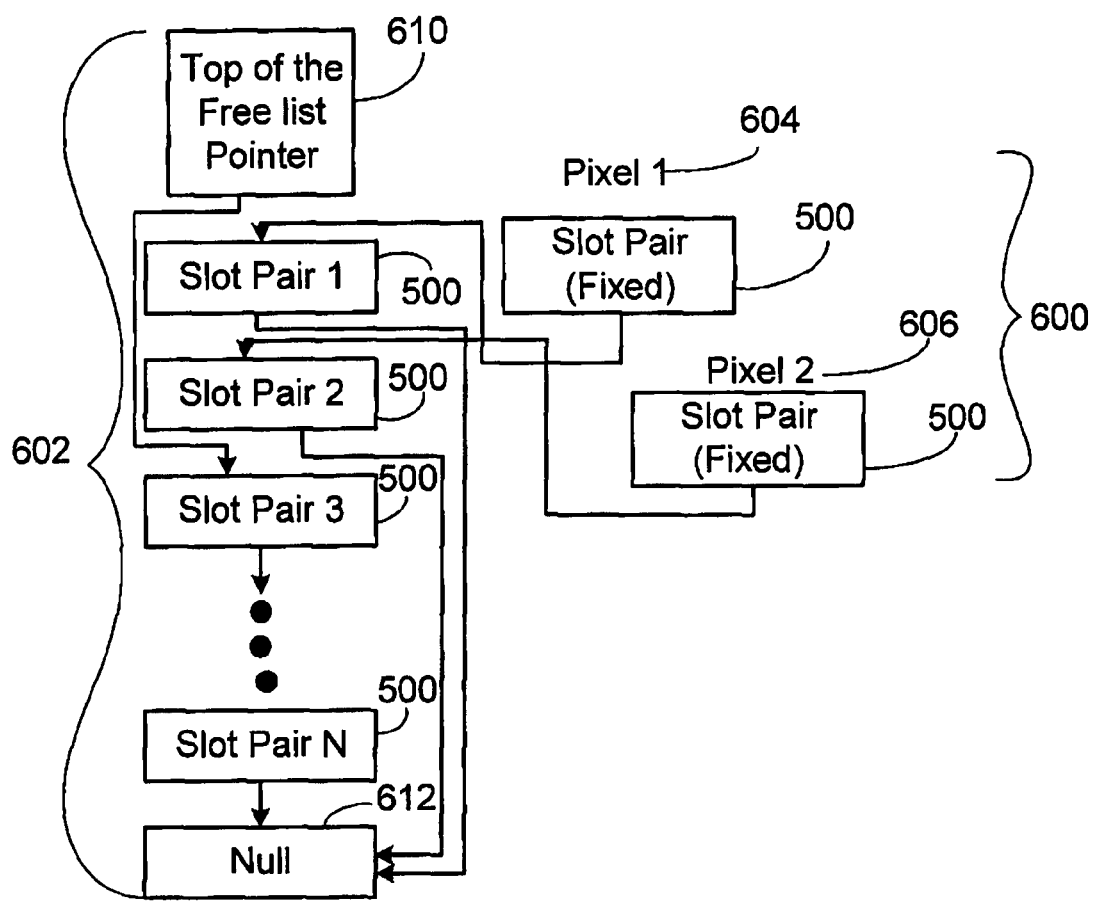
FIG. 6C shows another instance in which the first pixel of FIG. 6A includes the first slot pair in the free list, and the second pixel of FIG. 6A includes the second slot pair in the free list.

In preferred embodiments of the invention, slot pairs 500 are formed prior to their use. In particular, each slot may be generated upon start-up of the computer system. Image/pixel data may be stored in slots by retrieving an empty slot from memory, and adding attribute and slot management data to the appropriate fields. Slots preferably are stored in either in a fixed memory 600, or in a free memory list 602. To that end, each pixel preferably has an associated slot pair 500 in fixed memory 600, and may retrieve additional slot pairs 500, if available, from the free memory list 602 as necessary. FIGS. 6A, 6B, and 6C show exemplary slot pairs 500 arranged in this manner. Specifically, FIGS. 6A-6C show fixed memory 600 for a first pixel 604 and a second pixel 606, and the free memory list 602. The free memory list 602 includes N slot pairs 500 arranged in a linked list. As shown in such figures, a Top of Free List pointer ("top pointer 610") points to the first slot pair 500, which itself points to the second slot pair 500, which points to a third slot pair 500, etc. . . . to the Nth slot pair 500. The Nth slot pair 500, which is the last slot pair 500 in the free memory list 602, points to a null value 612 in memory (i.e., it has a null pointer), thus identifying it as the last slot pair 500 in the free memory list 602.

The fixed slot pair 500 of each pixel either points to the null value 612 (indicating that no free list slot pairs are associated with its pixel), or to a slot pair 500 in the free memory list 602 that includes data for such pixel. For example, FIG. 6A shows the first and second pixels 604 and 606 as having no slot pairs 500 from the free memory list. Accordingly, the respective fixed memory slot pairs 500 each point to the null value 612. In contrast, FIG. 6B shows an instance in which the first pixel 604 includes first and second slot pairs 500 in the free memory list. To that end, the slot pair 500 of the first pixel fixed memory 600 is set to point to the first free list slot pair 500, and the second free list slot pair 500 is set to point to the null value 612. The top pointer 610 thus is set to point to the top of the free memory list 602 (i.e., the first available slot pair 500 that can be utilized to include pixel data), which in this instance is the third slot pair 500. For completeness, it should be noted that the fixed memory slot pair 500 of the second pixel 606 points to the null value 612 because it includes no slot pairs 500 from the free memory list 602.

Figure 7:
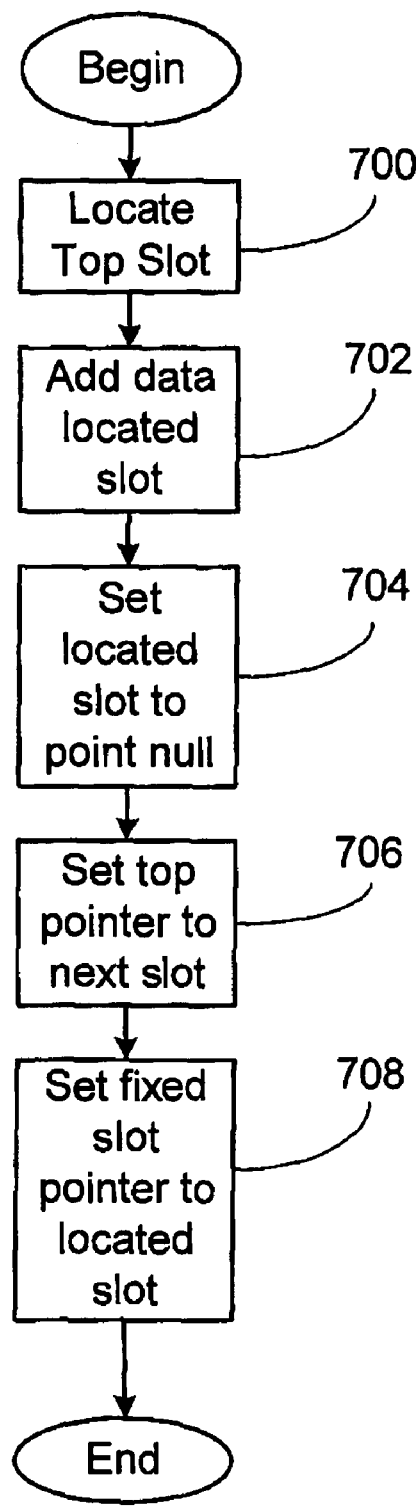
FIG. 7 shows a preferred process of adding data for a given pixel to a data slot on the free list.

FIG. 6C shows another instance in which the first pixel 604 includes the first slot pair 500 in the free memory list 602, and the second pixel 606 includes the second slot pair 500 in the free memory list 602. The pointers of each of the pixels and the slots in the free memory list 602 thus are set as shown in the figure. FIG. 7 shows a preferred process of adding data for a given pixel to a data slot on the free memory list 602. For example, such a process may be used when the fixed memory data slots may be filled, thus requiring additional data slots from the free memory list 602. The process begins at step 700 in which the top slot pair 500 in the free memory list 602 is located. To that end, the top pointer 610 is examined to determine to which slot pair 500 it is pointing. If, instead of pointing to a slot pair 500, the top pointer 610 points to the null value 612, then no slot pairs 500 are available. A back-off operation then may be performed to free filled slot pairs 500 (discussed below with reference to FIGS. 11 and 12).

The process then continues to step 702 in which attribute data is added to one of the data slots of the located slot pair 500. As noted above, the attribute data can include depth data, stencil data, color data, and a coverage mask 506. Once the attribute data is added, the located slot pair pointer fields are set to point to the null value 612 (step 704), and the top pointer 610 is set to point to the next slot pair 500 in the list (step 706). If the located slot pair 500 is the last slot pair 500 in the free memory list 602, then the top pointer 610 (in step 706) is set to point to the null value 612. The top pointer 610 may be set by examining the pointing fields (e.g., row fields 522 and 524) of the located slot pair 500 prior to its pointer fields being changed. Since such slot pair 500 points to the next available slot pair 500 in the free memory list 602 at such time, the top pointer 610 may copy such address to point to such next slot pair 500. In this manner, such next slot pair 500 effectively becomes the slot pair 500 at the top of the free memory list 602. The process thus continues to step 708 in which the pointer in the given pixel's fixed slot pair 500 is set to point to the located slot pair 500. It should be noted that each of the steps in this process may be executed in any order, or substantially simultaneously.

As noted above, the various pointers are set by modifying the various slot management fields in each slot pair 500. For example, with reference to the fixed slot pair 500 noted above when discussing FIG. 7, its pointer valid field 520 is set to "1", thus indicating that it is pointing to another slot pair 500 (i.e., the slot pair 500 in the free memory list 602). To identify such slot pair 500 in the free memory list 602, the two bit row field 522 is combined with the thirteen bit row field 524 to identify the address of the slot pair 500 in free memory. In addition, the five bit index field 126 is set to identify the row in memory of the free list slot pair 500.

Figure 8:
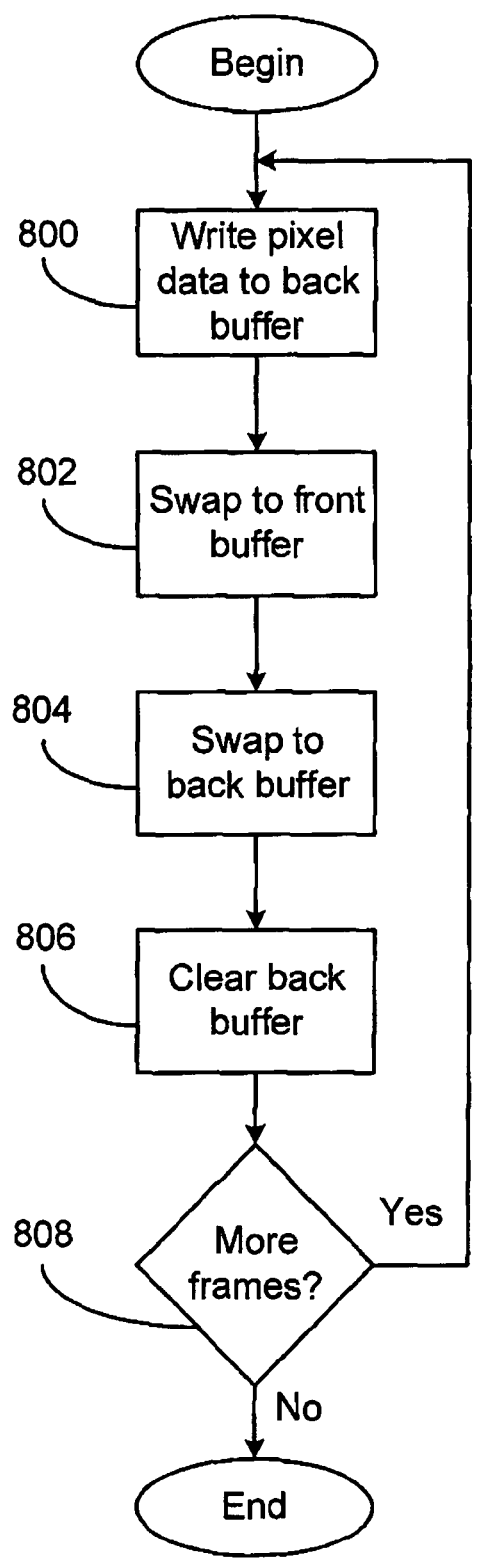
FIG. 8 shows a preferred method of illuminating pixels utilizing a double buffered frame buffer.

In preferred embodiments of the invention, pixels are illuminated on a frame-by-frame basis. Accordingly, one frame is displayed in the front buffer of the frame buffer 218, while another frame is being written to the back buffer. FIG. 8 shows a preferred method of illuminating pixels utilizing the double buffered frame buffer 218. The process begins at step 800 in which pixel data for a first frame is written to the back buffer. This step includes retrieving all data slots for each pixel, processing data within such slots, and then storing such processed pixel data in the back buffer. Additional details of this process are discussed below with reference to FIG. 9.

Once the entire first frame is written to the back buffer, a conventional buffer swap is executed in which the data in the back buffer effectively is "moved" to the front buffer (step 802). At a subsequent time (e.g., when data for a second frame is completely written to the back buffer), the first frame data in the front buffer is swapped again to the back buffer (step 804). Once in the back buffer, all data in the back buffer is cleared by executing a clear operation. This causes the data in all first frame data in the slots utilized by such frame to be erased, thus freeing such data slots. When cleared, pointers are reinitialized as necessary. It then is determined at step 808 if additional frames are to be generated. The process repeats if additional frames are to be generated. Conversely, the process ends if no additional frames are to be generated.

Figure 9:
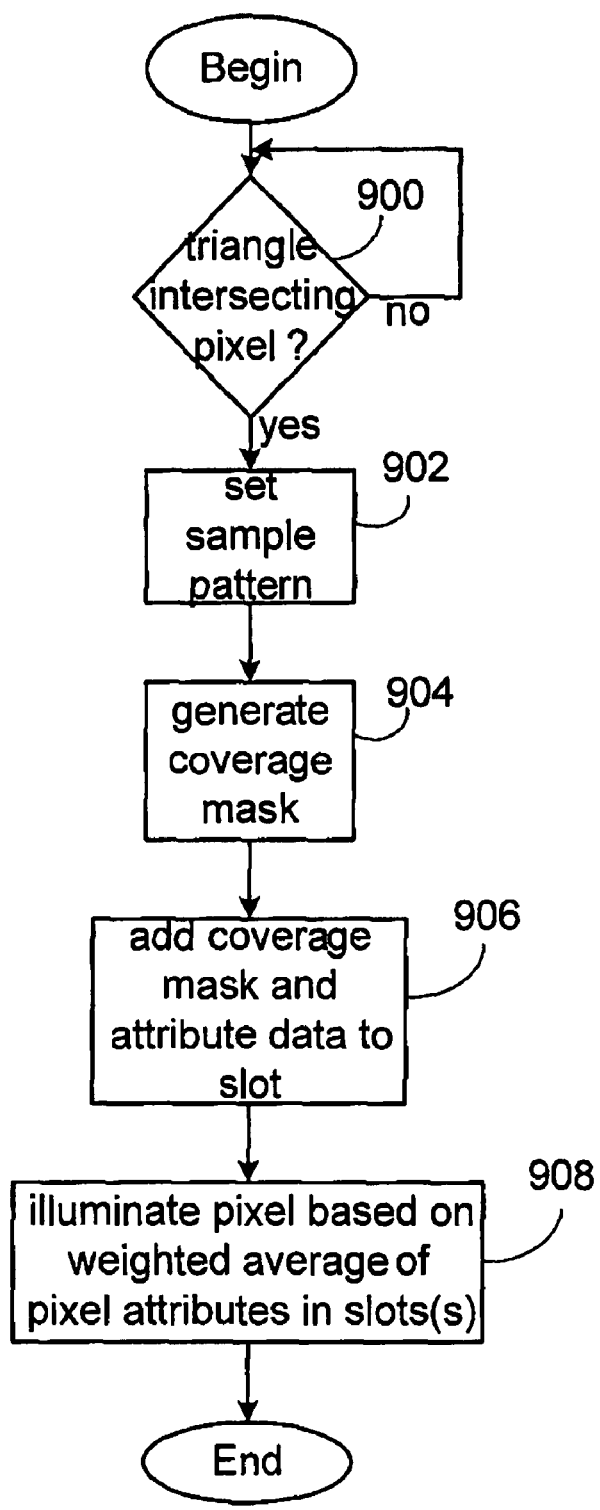
FIG. 9 shows a preferred process of illuminating a given pixel that may be intersected by a given triangle.

FIG. 9 shows a preferred process of illuminating a given pixel that may be intersected by a given triangle. As noted above, the given triangle may be a part of a larger image that is within a frame to be displayed by the display device 170. This process is executed for each pixel prior to and/or while writing pixel data to the back buffer (i.e., in step 800 above). The process begins at step 900 in which it is determined if the given triangle intersects the given pixel. If there is an intersection, then the process continues to step 902 in which the sample pattern for the given pixel is set. To that end, as noted above, the coordinates of the given pixel are utilized as input into the random number generator 402 (FIG. 4) to produce a random number. The resultant random number then is used as input into the pattern look-up table memory 404 to locate the specific sample pattern for the given pixel.

The process then continues to step 904 in which the coverage mask 506 is generated by the edge iterator 406 and the mask module 408 (discussed above). The generated coverage mask 506 and given triangle attribute data (e.g., color, depth, and alpha data) then are added to a slot that is retrieved from either the fixed memory 600 or the free memory list 602 (step 906). Of course, the pointers each are re-set if the slot is retrieved from the free memory. Moreover, the coverage mask 506 may be adjusted (FIG. 10) based upon the Z-center value of the given triangle.

Once the slot is filled with data relating to the given triangle, then the given pixel is illuminated based upon a weighted average of all data slots utilized by the given pixel for the frame being generated (step 908). Such weighted average is generated based upon the coverage mask 506 for each intersecting triangle. More particularly, the color and transparency data for the given slot is given a weight based upon the total number of bits that are set in the coverage mask 506. Accordingly, the colors of the given triangle should be more of a contributor to pixel color as more bits of its coverage mask 506 are set. After the contribution of each triangle intersecting the given pixel is determined (i.e., after all slots associated with the given pixel are processed), then such contributions are combined to produce the resultant pixel color.

In preferred embodiments, the first fixed slot of any given pixel often is first used for a background image, while the second fixed slot is used for the first image (i.e., first triangle), if any, that intersects the given pixel. For example, on a frame displaying a sky and other images in the sky (e.g., birds), the first fixed slot is utilized to store data relating to the sky, while the second fixed slot is utilized to store data relating to a triangle, if any, that intersects the given pixel. If a non-background triangle entirely covers the given pixel, however, then the coverage mask 506 for the first fixed slot thus is set to "0", which consequently nullifies the attribute contribution of any data in the first fixed slot.

In preferred embodiments, a single sample location 302 cannot have more than one triangle intersecting it. Accordingly, if more than one triangle are determined to intersect a single sample location, it must be determined which triangle is "in front" (discussed above) at such sample location. Once determined, the coverage mask 506 for triangles not in front are set to "0" for that sample location. This leaves the coverage mask 506 for the one triangle determined to be in front with a "1" in such sample location. This process is referred to herein as "adjusting" the coverage masks 506.

Figure 10:
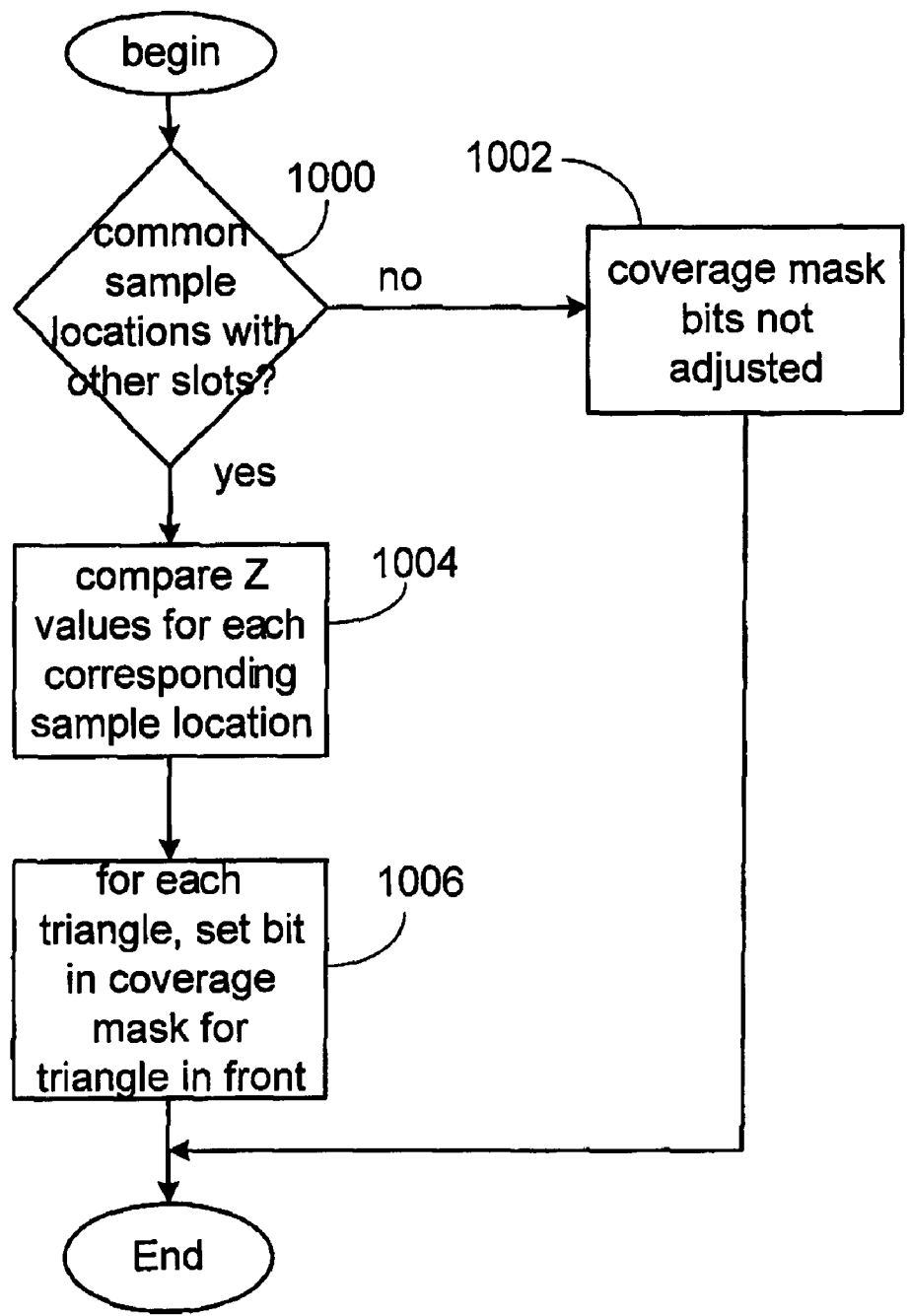
FIG. 10 shows a preferred process of adjusting the coverage mask in a given data slot as such slot is filled with data for a given pixel.

FIG. 10 shows a preferred process of adjusting the coverage mask 506 in a given data slot as such slot is filled with data for a given pixel. The process begins at step 1000 in which it is determined if the triangle of the given slot covers any sample locations 302 that are covered by other triangles intersecting the given pixel. To that end, the coverage masks 506 of each data slot for the given pixel are compared. If, for the given pixel, no more than one bit is set for corresponding bits in all coverage masks 506, then the process continues to step 1002 in which the coverage mask 506 is not adjusted, thus ending the process. A bit is considered to "correspond" with a bit of another coverage mask 506 when it is in the same location as the other bit. For example, bit two in a first coverage mask 506 corresponds with bit two in all other coverage masks 506 for the given pixel. Conversely, bit two does not correspond with bits zero, one, or three through fifteen of other coverage masks 506.

If, however, more than one bit is set for corresponding bits in all coverage masks 506, then the process continues to step 1004 in which the depth values for each such set corresponding sample locations 302 are compared. For example, a bit two and three of both a first and second coverage mask 506 (for first and second triangles) may be set to "1". Accordingly, it is determined which triangle has a higher depth value (i.e., which triangle is in front) at each corresponding set sample location. In the immediately preceding example, it is determined which triangle is in front at sample location two, and which triangle is in front at sample location three. To that end, the gradient values and Z center values are utilized in a conventional manner to calculate the actual depth value at the specific sample locations 302. As known by those skilled in the art, one triangle can be in front of another at one sample location, and yet be behind the same triangle at another sample location.

Once it is determined which triangle is in front at the corresponding set sample locations 302, then the process continues to step 1006 in which the sample location 302 in the coverage mask 506 for the triangle determined to be in front is set to a "1" value. The other corresponding sample locations 302 in other coverage masks 506 thus all are set to a "0" value. Accordingly, the cumulative total number of bits set to "1" in all coverage masks 506 cannot be greater than the total number of sample locations 302 for the pixel. For example, no more than sixteen total coverage mask bits can be set for all triangles when a pixel has sixteen sample locations 302.

Another example of the process shown in FIG. 10 includes three slots having the following coverage masks 506 for bits zero to fifteen (bit fifteen being to the far left, and bit zero being to the far right):

0000 0000 0000 0001 (coverage mask 506 of slot one)
1100 1111 1111 1101 (coverage mask 506 of slot two)
0000 0001 0000 0001 (coverage mask 506 of slot three)

Accordingly, during step 1000, it is determined that slots one, two, and three have a common sample location 302 at sample location zero, and slots two and three have a common sample location 302 at sample location nine. The Z values thus are compared for each common sample location 302 at step 1004. For simplicity, assume that after comparing depth values, slot two is in front of the other two slots at sample location zero, while slot three is in front of slot two at sample location nine. Accordingly, the coverage masks 506 are adjusted as follows:

0000 0000 0000 0000 (adjusted coverage mask 506 of slot one)
1100 1110 1111 1101 (adjusted coverage mask 506 of slot two)
0000 0001 0000 0000 (adjusted coverage mask 506 of slot three)

These adjusted coverage masks 506 thus are added to their respective slots for processing. As noted above, the weighted attribute averages will then be calculated based upon these coverage masks 506.

As noted above, if all slot pairs 500 in the free memory list 602 are used, preferred embodiments reduce the number of sample locations 302, which often reduces the total number of triangles that intersect a given pixel. This process of reducing the total number of sample locations 302 is referred to herein as a "back-off process." Consequently, each slot pair 500 utilizes its back-off field 528 to indicate if the data within its slot pair 500 has executed this back-off process to store triangle data.

The back-off function takes advantage of the fact that no more triangles than the total number of sample locations 302 on a pixel can be represented (in the defined manner) as intersecting such pixel. For example, if a given pixel has sixteen sample locations 302, then no more than sixteen triangles can be represented as intersecting it. Accordingly, if the total number of sample locations 302 is reduced to eight, then no more than eight triangles can intersect it. Since the maximum number of triangles that intersects a pixel is reduced linearly as the total number of sample locations 302 decreases, then fewer data slots are required, in many instances, to represent such pixel.

As suggested above, however, merely reducing the total number of sample locations 302 does not necessarily reduce the total number of triangles intersecting a pixel. For example, a given pixel with sixteen sample locations 302 may have three triangles that intersect it at three given sample locations 302. If the total number of sample locations 302 is reduced to eight, and the three given sample locations 302 are among the eight remaining sample locations 302, then data for such three triangles still must be saved. If, however, the total number of sample locations 302 is reduced to two, then at least one of the triangles by definition cannot intersect the pixel. For example, if first, second, and third triangles intersect a given pixel at respective first, second, and third sample locations 302, and the total number of sample locations 302 is reduced to the first and second sample locations 302, then the third triangle no longer intersects the pixel. Data for the third triangle thus is not saved in a data slot, consequently saving memory. In a similar manner, if, in the immediately preceding example, each of the first through third sample locations 302 are all removed, then none of the triangles intersects the given pixel. Of course, in preferred embodiments, this results in a savings of only one data slot since the slot pair 500 in fixed memory 600 still is allocated for the given pixel.

Figure 11:
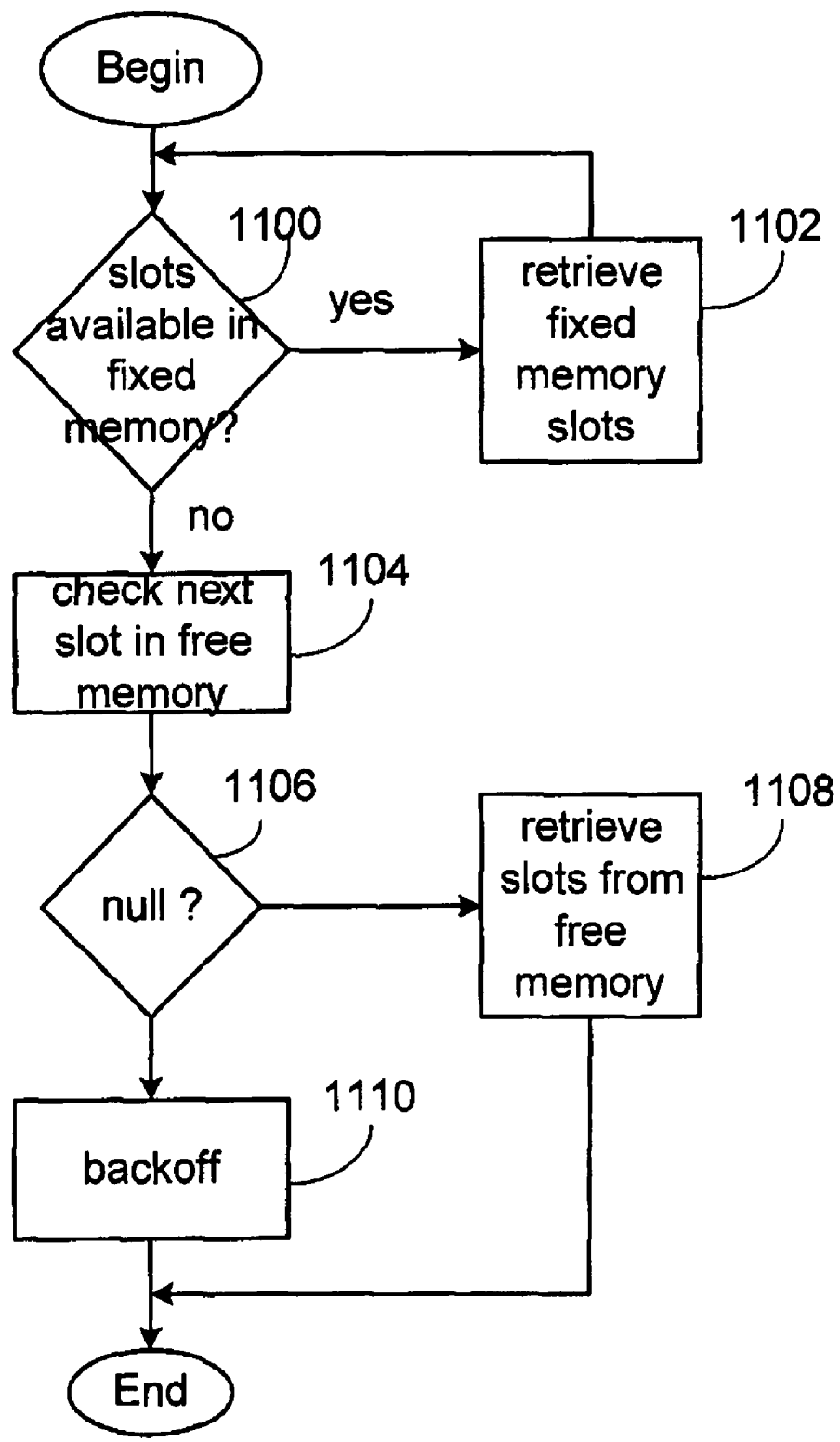
FIG. 11 shows a preferred process of initiating the back-off function for a given pixel.

FIG. 11 shows a preferred process of initiating the back-off function for a given pixel. As noted above, the back-off function preferably is utilized by a pixel that requests a slot pair 500 from the free memory list 602 when the free memory list 602 has no available slot pairs 500. The process begins at step 1100 in which it is determined if the slot pair 500 in fixed memory 600 assigned to the given pixel is available for adding triangle data. If available, then the process continues to step 1102 in which the such fixed memory slot pair 500 is utilized to store triangle data.

Conversely, if it is determined at step 1100 that such fixed memory slot pair 500 is not available, then the process continues to step 1104 in which the next slot in free memory is requested. To that end, the top pointer 610 is located to determine if such pointer is pointing to a slot pair 500, or to the null value 612 (step 1106). If determined to not point to the null value 612 (i.e., the top of list pointer points to an available slot pair 500), then the process continues to step 1108 in which such available slot pair 500 is retrieved and utilized to store triangle information for the given pixel. Pointers then are adjusted as described above with reference to FIGS. 6A-6C. If it is determined at step 1106 that the top of list pointer in fact is pointing to the null value 612, then the process continues to step 1110 in which the back-off function is initiated, thus ending the process.

Figure 12:
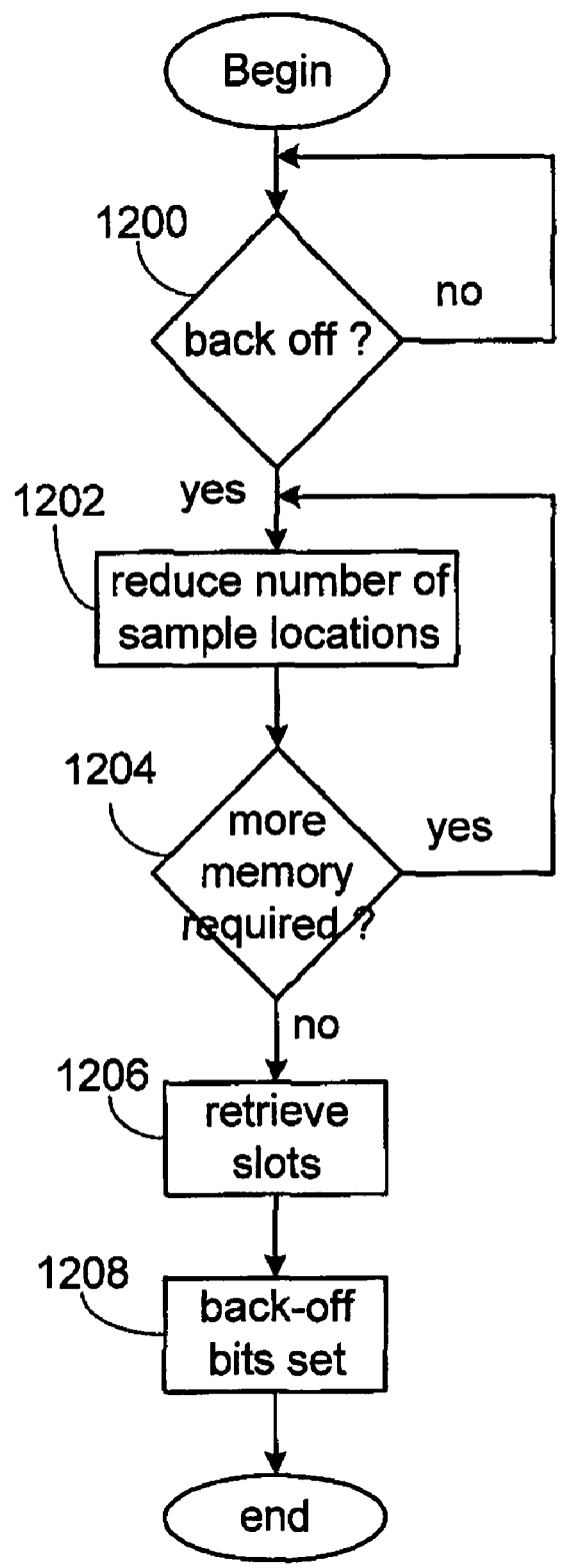
FIG. 12 shows a preferred process of executing the back-off function.

FIG. 12 shows a preferred process of executing the back-off function (i.e., step 1110). The process begins at step 1200 in which it is determined that the back-off function is to be executed. The process then continues to step 1202 in which the number of sample locations 302 is reduced. In preferred embodiments, the total number of sample locations 302 is reduced in half from the current total. For example, if the total number of sample locations 302 currently is sixteen, then such sample locations 302 are reduced to eight. When reducing the sample locations 302 in this manner, every other existing sample location 302 may be removed. For example, when reducing from sixteen to eight sample locations 302, every odd sample location 302 (e.g., 1, 3, 5 . . . 15) may be removed.

The process then continues to step 1204 in which it is determined if more memory is required (i.e., it is determined if a slot has not become available). Specifically, in preferred embodiments, it is determined if the reduction in sample locations 302 removed any triangles from those intersecting the given pixel. If any triangles are removed, then their free list slot(s) may be used to store new triangle data. In some cases, the reduction in sample locations 302 can remove the actual triangle that the given pixel currently is attempting to store. In such cases, the process ends. It thus is determined at step 1204 if the current triangle still intersects the given pixel and, if it does, if any slots have become available as a result of the reduction in sample locations 302. By way of example, if the given pixel had sixteen sample locations 302 with nine intercepting triangles, then at least one triangle (and possibly more) necessarily would no longer intersect the given pixel if eight sample locations 302 have been eliminated. If no slots have become available and the current triangle still intersects the given pixel, then the process loops back to step 1202 in which the total number of sample locations 302 again is reduced. In preferred embodiments, this process continues, as necessary, until two sample locations 302 remain. Of course, since no more than two triangles can intersect the pixel when it has only two sample locations 302, such pixel can store such triangle data in its fixed slot pair 500 and thus, does not require slot pairs 500 from the free memory list 602. In some embodiments, if, after reducing the sample locations 302, all intercepting triangles can be stored without use of the free list slot pairs 500, then the process ends.

Returning to step 1204, if it is determined that no more memory is required (i.e., a new slot has become available) and the current triangle still intersects at least one of the remaining sample locations 302, then the process continues to step 1206 in which the newly available slot is retrieved. Once retrieved, the current triangle data is stored in such slot. As suggested above, no additional memory may be required if the current triangle does not intersect any of the remaining sample locations 302. In such case, the process ends without retrieving any slots (even if some are available) and the next pixel can attempt to retrieve slots from the free memory list 602.

The process then continues to step 1208 in which the bits in the back-off field 528 in the slot pair 500 are set to indicate the total number of sample locations 302 that were utilized to determine if the triangle(s) in such slot pair 500 intersected the given pixel. In preferred embodiments, the following bit patterns are utilized to identify the total number of sample locations 302:

00—sixteen sample locations 302 (i.e., no back-off process used);

01—eight sample locations 302;

10—four sample locations 302; and

11—two sample locations 302.

When utilizing back-off process, preferred embodiments of the coverage mask 506 still have sixteen bits. Only those intersected sample locations 302 that still are active, however, are set to "1.". For example, if every odd sample location 302 is removed, then their respective bits in the coverage mask 506 are all set to "0." As a further example, if only two sample locations 302 remain, then no more than two of the bits in the coverage mask 506 can be set to "1." Accordingly, when data is read from a slot pair 500, the coverage mask 506 first is examined to determine if such slot pair 500 has utilized the back-off process. Data then is read from the coverage mask 506 based upon the value in the back-off field 528.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A method of displaying a first image on a display device, the display device having a plurality of pixels, each pixel having a unique location on the display device, the method comprising:

assigning one of a plurality of sample patterns to each pixel on the display device, each pixel being assigned the one of a plurality of sample patterns based upon its unique location on the display device, each sample pattern having at least one sample location, wherein the first image is defined by first image attribute data and first image depth data, the first image depth data defining the depth plane of the first image;

determining if the first image intersects any of the sample locations on each pixel; illuminating pixels determined to have at least one sample location that intersects the first image;

wherein the act of illuminating a given pixel comprising:

determining, on the given pixel, if a second image intersects at least one sample location that is intersected by the first image, the second image having second image depth data defining the depth plane of the second image; and utilizing at least the first image attribute data to illuminate the given pixel if the first image depth data indicates that the first image is at a higher depth plane than the depth plane of the second image for at least one of the intersected sample locations.

2. The method as defined by claim 1 wherein the second image includes second image attribute data, the act of illuminating the given pixel further comprising:
utilizing at least the second image attribute data to illuminate the given pixel if the second image depth data indicates that the second image is at a higher depth plane than the depth plane of the first image for at least one of the intersected sample locations.

3. The method as defined by claim 2 wherein the act of illuminating comprises: utilizing a weighted average of the first image attribute data and the second image attribute data to illuminate the given pixel.

4. The method as defined by claim 1 wherein attribute data comprises color data.

5. The method as defined by claim 1 wherein the sample patterns include a first sample pattern and a second sample pattern, the first sample pattern having sample locations that are different than the sample locations in the second sample pattern.

6. The method as defined by claim 1 wherein each sample pattern is stored in a look-up table, the act of assigning comprising:
accessing the look-up table to locate the sample pattern for each pixel, the look-up table being accessed for a given pixel based upon the unique location of the given pixel on the display device.

7. The method as defined by claim 6 further comprising:
assigning a random number to each pixel based upon its unique location on the display device; and
utilizing the random number for the given pixel as an index to the look-up table to retrieve the sample pattern for the given pixel.

8. An apparatus for displaying a first image on a display device, the display device having a plurality of pixels, each pixel having a unique location on the display device, the apparatus comprising:
a pattern assignor that assigns one of a plurality of sample patterns to each pixel on the display device, each pixel being assigned the one of a plurality of sample patterns based upon its unique location on the display device, each sample pattern having at least one sample location;
an image detector operatively coupled to the pattern assignor, the image detector determining if the first image intersects any of the sample locations on each pixel; and
a pixel illuminator operatively coupled with the image detector, the pixel illuminator illuminating pixels determined to have at least one sample location that intersects the first image;
wherein the first image is defined by first image attribute data and first image depth data, the first image depth data defining the depth plane of the first image, the illuminator comprising:
means for determining, on the given pixel, if a second image intersects at least one sample location that is intersected by the first image, the second image having second image depth data defining the depth plane of the second image; and
means for utilizing at least the first image attribute data to illuminate the given pixel if the first image depth data indicates that the first image is at a higher depth plane than the depth plane of the second image for at least one of the intersected sample locations.

9. The apparatus as defined by claim 8 wherein the second image includes second image attribute data, the illuminator further comprising:

means for utilizing at least the second image attribute data to illuminate the given pixel if the second image depth data indicates that the second image is at a higher depth plane than the depth plane of the first image for at least one of the intersected sample locations.

10. The apparatus as defined by claim 9 wherein the illuminator comprises: an averaging module that utilizes a weighted average of the first image attribute data and the second image attribute data to illuminate the given pixel.

11. The apparatus as defined by claim 8 wherein attribute data comprises color data.

12. The apparatus as defined by claim 8 wherein the sample patterns include a first sample pattern and a second sample pattern, the first sample pattern having sample locations that are different than the sample locations in the second sample pattern.

13. The apparatus as defined by claim 8 wherein each sample pattern is stored in a look-up table, the pattern assignor comprising:
a look-up table manager that accesses the look-up table to locate the sample pattern for each pixel, the look-up table being accessed for a given pixel based upon the unique location of the given pixel on the display device.

14. The apparatus as defined by claim 13 further comprising:
means for assigning a random number to each pixel based upon its unique location on the display device; and
means for utilizing the random number for the given pixel as an index to the look-up table to retrieve the sample pattern for the given pixel.

15. A device having a computer storage medium for displaying a first image on a display device, the display device having a plurality of pixels, each pixel having a unique location on the display device, the computer storage medium storing computer readable program code thereon to cause a computer system to illuminating a pixel on the display device, the computer readable program code including:
program code for assigning one of a plurality of sample patterns to each pixel on the display device, each pixel being assigned the one of a plurality of sample patterns based upon its unique location on the display device, each sample pattern having at least one sample location;
program code for determining if the first image intersects any of the sample locations on each pixel; and
program code for illuminating pixels determined to have at least one sample location that intersects the first image, wherein the first image is defined by first image attribute data and first image depth data, the first image depth data defining the depth plane of the first image, the program code for illuminating a given pixel comprising:
program code for determining, on the given pixel, if a second image intersects at least one sample location that is intersected by the first image, the second image having second image depth data defining the depth plane of the second image; and
program code for utilizing at least the first image attribute data to illuminate the given pixel if the first image depth data indicates that the first image is at a higher depth plane than the depth plane of the second image for at least one of the intersected sample locations.

16. The device as defined by claim 15 wherein the second image includes second image attribute data, the program code for illuminating the given pixel further comprising:
program code for utilizing at least the second image attribute data to illuminate the given pixel if the second image depth data indicates that the second image is at a higher depth plane than the depth plane of the first image for at least one of the intersected sample locations.

17. The device as defined by claim 16 wherein the program code for illuminating comprises:
program code for utilizing a weighted average of the first image attribute data and the second image attribute data to illuminate the given pixel.

18. The device as defined by claim 15 wherein attribute data comprises color data.

19. The device as defined by claim 15 wherein the sample patterns include a first sample pattern and a second sample pattern, the first sample pattern having sample locations that are different than the sample locations in the second sample pattern.

20. The device as defined by claim 15 wherein each sample pattern is stored in a look-up table, the program code for assigning comprising:
program code for accessing the look-up table to locate the sample pattern for each pixel, the look-up table being accessed for a given pixel based upon the unique location of the given pixel on the display device.

21. The device as defined by claim 20 further comprising:
program code for assigning a random number to each pixel based upon its unique location on the display device; and
program code for utilizing the random number for the given pixel as an index to the look-up table to retrieve the sample pattern for the given pixel.

22. A method of illuminating a pixel on a display device, the method comprising:
detecting one or more images that intersect the pixel; providing a data slot for each image that intersects the pixel, each data slot including attribute data and depth data for its image on the pixel;
calculating a weighted pixel attribute average for the attribute data of all slots, the weighted average being calculated each time a new slot is generated; and
utilizing the weighted average to illuminate the pixel each time the weighted average is calculated, wherein each slot includes a coverage mask that defines the amount that the image covers the pixel, the weighted pixel attribute average being based upon the coverage mask in each data slot, and wherein the pixel includes a plurality of sample locations, each slot including depth data identifying the depth plane of its image, each coverage mask defining any sample locations that are covered by the image, the weighted average being based upon the depth data in each slot if two or more coverage masks indicate that their respective images intersect a common sample location.

23. The method as defined by claim 22 wherein each data slot is stored in memory as a list.

24. The method as defined by claim 22 wherein the pixel includes at least one sample location, each data slot including a coverage mask that identifies each sample location that is covered by its image.

25. The method as defined by claim 24 wherein the display device includes a second pixel having a set of sample locations, the at least one sample location on the pixel being different than the set of sample locations of the second pixel.

26. A method of storing pixel data for illuminating a pixel on a display device, the method comprising:
sampling the pixel to produce a first number of samples;
allocating a given portion of pixel memory for storing pixel data, the pixel data being stored in data slots in the pixel memory, the pixel data in each data slot representing the intersection of one image with the samples, the storage of pixel data in each data slot being based upon the total number of samples;
determining if the given portion of pixel memory is filled; and
reducing the first number of samples if it is determined that the given portion of pixel memory is filled.

27. The method as defined by claim 26 wherein the given portion of pixel memory is a non-contiguous block of memory.

28. The method as defined by claim 26 wherein the given portion of pixel memory is preconfigured to include a given number of data slots with no pixel data, the given portion of pixel memory being determined to be filled when pixel data is stored in all of the given number of data slots.

29. The method as defined by claim 28 further comprising:
determining that a given image intersects with at least one of the samples;
locating a data slot with no data in the given portion of pixel memory if the given image is determined to intersect at least one of the samples; and
storing pixel data relating to the given image in the located data slot.

30. The method as defined by claim 26 wherein one or more data slots in the pixel memory are made available for storing pixel data as a result of the first number of samples being reduced.

31. The method as defined by claim 26 wherein no pixel data for a given image is stored in a data slot when no samples intersect the given image.

32. The method as defined by claim 26 wherein each data slot includes a coverage mask identifying a set of samples that intersects the image.

33. The method as defined by claim 32 wherein the coverage mask includes a single bit representing each of the samples.

34. The method as defined by claim 26 wherein the pixel data representing the intersection of one image with the samples includes data identifying the total number of samples that are intersected.

35. The method as defined by claim 34 wherein the total number of samples that are intersected ranges from no samples to the first number of samples.

36. An apparatus for storing pixel data for illuminating a pixel on a display device, the display device being coupled with pixel memory, the apparatus comprising:
a sampling module that samples the pixel to produce a first number of samples;
a memory controller operatively coupled with the sampling module, the memory controller allocating a given portion of pixel memory for storing pixel data, the pixel data being stored in data slots in the pixel memory, the pixel data in each data slot representing the intersection of one image with the samples, the storage of pixel data in each data slot being based upon the total number of samples, the memory controller determining if the given portion of pixel memory is filled; and
a sample reduction module operatively coupled with the memory controller, the sample reduction module reducing the first number of samples if it is determined that the given portion of pixel memory is filled, at least a portion of the given portion of pixel memory becoming available as a result of the first number of pixels being reduced.

37. The apparatus as defined by claim 36 wherein the given portion of pixel memory is a non-contiguous block of memory.

38. The apparatus as defined by claim 36 wherein the given portion of pixel memory is preconfigured to include a given number of data slots with no pixel data, the given portion of pixel memory being determined to be filled when pixel data is stored in all of the given number of data slots.

39. The apparatus as defined by claim 38 further comprising:
 means for determining that a given image intersects with at least one of the samples;
 means for locating a data slot with no data in the given portion of pixel memory if the given image is determined to intersect at least one of the samples; and
 means for storing pixel data relating to the given image in the located data slot.

40. The apparatus as defined by claim 36 wherein one or more data slots in the pixel memory are made available for storing pixel data as a result of the first number of samples being reduced.

41. The apparatus as defined by claim 36 wherein no pixel data for a given image is stored in a data slot when no samples intersect the given image.

42. The apparatus as defined by claim 36 wherein each data slot includes a coverage mask identifying a set of samples that intersects the image.

43. The apparatus as defined by claim 42 wherein the coverage mask includes a single bit representing each of the samples.

44. The apparatus as defined by claim 36 wherein the pixel data representing the intersection of one image with the samples includes data identifying the total number of samples that are intersected.

45. The apparatus as defined by claim 44 wherein the total number of samples that are intersected ranges from no samples to the first number of samples.

46. A device having a computer storage medium for use with a computer system for storing pixel data for illuminating a pixel on a display device, the computer storage medium storing computer readable program code thereon to cause the computer system to illuminating the pixel on the display device, the computer readable program code including:
 program code for sampling the pixel to produce a first number of samples;
 program code for allocating a given portion of pixel memory for storing pixel data, the pixel data being stored in data slots in the pixel memory, the pixel data in each data slot representing the intersection of one image with the samples, the storage of pixel data in each data slot being based upon the total number of samples;
 program code for determining if the given portion of pixel memory is filled; and
 program code for reducing the first number of samples if it is determined that the given portion of pixel memory is filled, at least a portion of the given portion of pixel memory becoming available as a result of the first number of pixels being reduced.

47. The device as defined by claim 46 wherein the given portion of pixel memory is a non-contiguous block of memory.

48. The device as defined by claim 46 wherein the given portion of pixel memory is preconfigured to include a given number of data slots with no pixel data, the given portion of pixel memory being determined to be filled when pixel data is stored in all of the given number of data slots.

49. The device as defined by claim 48 further comprising:
 program code for determining that a given image intersects with at least one of the samples;
 program code for locating a data slot with no data in the given portion of pixel memory if the given image is determined to intersect at least one of the samples; and
 program code for storing pixel data relating to the given image in the located data slot.

50. The device as defined by claim 46 wherein one or more data slots in the pixel memory are made available for storing pixel data as a result of the first number of samples being reduced.

51. The device as defined by claim 46 wherein no pixel data for a given image is stored in a data slot when no samples intersect the given image.

52. The device as defined by claim 46 wherein each data slot includes a coverage mask identifying a set of samples that intersects the image.

53. The device as defined by claim 52 wherein the coverage mask includes a single bit representing each of the samples.

54. The device as defined by claim 46 wherein the pixel data representing the intersection of one image with the samples includes data identifying the total number of samples that are intersected.

55. The device as defined by claim 54 wherein the total number of samples that are intersected ranges from no samples to the first number of samples.

56. A method of storing pixel data for illuminating a given pixel on a display device, the display device including a plurality of pixels, the method comprising:
 sampling the given pixel to produce a first number of samples, at least one of the samples being intersected by a given image;
 allocating a given portion of pixel memory for storing pixel data for any image that intersects any of the plurality of pixels on the display device;
 determining if the given portion of pixel memory is filled with pixel data;
 reducing the first number of samples if it is determined that the given portion of pixel memory is filled with pixel data, at least a portion of the given portion of pixel memory becoming available as a result of the first number of pixels being reduced; and
 storing pixel data relating to the given pixel in the given portion of the pixel memory.

57. The method as defined by claim 56 wherein the pixel memory includes a plurality of data slots for storing pixel data, the pixel data relating to the given pixel being stored in a data slot.

58. An apparatus for storing pixel data for illuminating a given pixel on a display device, the display device including a plurality of pixels, the apparatus comprising:
 a sampling module that samples the given pixel to produce a first number of samples, at least one of the samples being intersected by a given image;
 a memory controller operatively coupled with the sampling module, the memory controller allocating a given portion of pixel memory for storing pixel data for any image that intersects any of the plurality of pixels on the display device, the memory controller also determining if the given portion of pixel memory is filled with pixel data;
 a sample reduction module operatively coupled with the memory controller, the sample reduction module reducing the first number of samples if it is determined that the given portion of pixel memory is filled with pixel data, at least a portion of the given portion of pixel memory becoming available as a result of the first number of pixels being reduced; and
 a pixel data storage module operatively coupled with the memory controller, the pixel data storage module storing pixel data relating to the given pixel in the given portion of the pixel memory.

59. The apparatus as defined by claim 58, wherein the pixel memory includes a plurality of data slots for storing pixel data, the pixel data relating to the given pixel being stored in a data slot.

60. A device having a computer storage medium for use on a computer system for storing pixel data for illuminating a given pixel on a display device, the display device including a plurality of pixels, the computer storage medium storing medium having computer readable program code thereon to cause the computer system to illuminating the given pixel on the display device, the computer readable program code including:

program code for sampling the given pixel to produce a first number of samples, at least one of the samples being intersected by a given image;

program code for allocating a given portion of pixel memory for storing pixel data for any image that intersects any of the plurality of pixels on the display device;

program code for determining if the given portion of pixel memory is filled with pixel data;

program code for reducing the first number of samples if it is determined that the given portion of pixel memory is filled with pixel data, at least a portion of the given portion of pixel memory becoming available as a result of the first number of pixels being reduced; and program code for storing pixel data relating to the given pixel in the given portion of the pixel memory.

61. The device as defined by claim 60 wherein the pixel memory includes a plurality of data slots for storing pixel data, the pixel data relating to the given pixel being stored in a data slot.

* * * * *